United States Patent
Hebert et al.

(10) Patent No.: US 9,898,455 B2
(45) Date of Patent: Feb. 20, 2018

(54) NATURAL LANGUAGE UNDERSTANDING CACHE

(71) Applicant: Nuance Communications, Inc., Burlington, MA (US)

(72) Inventors: Matthieu Hebert, Beauharnois (CA); Andre Gillet, Verdun (CA)

(73) Assignee: Nuance Communications, Inc., Burlington, MA (US)

( * ) Notice: Subject to any disclaimer, the term of this patent is extended or adjusted under 35 U.S.C. 154(b) by 381 days.

(21) Appl. No.: 14/556,904

(22) Filed: Dec. 1, 2014

(65) Prior Publication Data
US 2016/0154783 A1    Jun. 2, 2016

(51) Int. Cl.
*G06F 17/30* (2006.01)
*G06F 17/27* (2006.01)
*G06F 12/0875* (2016.01)

(52) U.S. Cl.
CPC ...... *G06F 17/2705* (2013.01); *G06F 12/0875* (2013.01); *G06F 17/3087* (2013.01); *G06F 17/30997* (2013.01); *G06F 2212/452* (2013.01)

(58) Field of Classification Search
CPC .......... G06F 17/2705; G06F 17/30997; G06F 17/279; G06F 17/28; G06F 17/3087;
(Continued)

(56) References Cited

U.S. PATENT DOCUMENTS 5,794,059 A * 8/1998 Barker ............... G06F 9/30036
                                                        712/1
5,895,050 A * 4/1999 Dodd ........................ A63F 9/18
                                                        273/431
(Continued)

FOREIGN PATENT DOCUMENTS

EP          1302862 A2    4/2003
WO       2010080180 A1    7/2010

OTHER PUBLICATIONS

Mitchell Marcus—"New trends in natural language processing: Statistical natural language processing"—Proc. Natl. Acad. Sci. USA vol. 92, pp. 10052-10059, Oct. 1995 Colloquium Paper:presented at a colloquium entitled "Human-Machine Communication by Voice," organized at The Arnold and Mabel Beckman Centerin Irvine, CA, Feb. 8-9, 1993.*

(Continued)

*Primary Examiner* — Anh Ly
(74) *Attorney, Agent, or Firm* — Banner & Witcoff, Ltd.

(57) ABSTRACT

Disclosed methods and systems are directed to natural language understanding cache usage. The methods and systems may include receiving a first natural language input comprising a set of one or more terms, and parsing the first natural language input to determine a first pretag result comprising a first string comprising at least one term from the set of one or more terms. The methods and systems may also determine that if the first pretag result corresponds to a key stored in a cache, then retrieve one or more cached NLU results corresponding to the at least one key. The methods and systems may also determine that if the first pretag result does not correspond to a key stored in the cache, then determine, based on the set of one or more terms, a first NLU result corresponding to the first natural language input.

20 Claims, 12 Drawing Sheets

(58) Field of Classification Search
CPC ............... G06F 17/30; G06F 2212/452; G06F 12/0875; G06F 17/30864; H04W 4/16; H04W 40/20; H04M 7/006; G10L 15/187; G10L 15/26; G10L 15/197; H04L 61/1511
See application file for complete search history.

(56) References Cited

U.S. PATENT DOCUMENTS

| | | | | |
|---|---|---|---|---|
| 6,963,831 B1* | 11/2005 | Epstein | ............... | G06F 17/2715 704/270 |
| 7,058,567 B2* | 6/2006 | Ait-Mokhtar | ......... | G06F 17/271 704/1 |
| 7,353,176 B1* | 4/2008 | Baray | ................... | G10L 15/22 704/257 |
| 8,346,563 B1* | 1/2013 | Hjelm | ................. | G10L 15/1822 379/88.01 |
| 8,442,812 B2* | 5/2013 | Ehsani | ................ | G06F 17/2775 704/231 |
| 9,318,027 B2* | 4/2016 | Byron | ...................... | G09B 7/00 706/231 |
| 9,437,186 B1* | 9/2016 | Liu | ......................... | G10L 15/05 704/9 |
| 9,454,525 B2* | 9/2016 | Balchandran | ....... | G06F 17/2715 704/9 |
| 2003/0225825 A1* | 12/2003 | Healey | ..................... | G06F 8/00 709/203 |
| 2004/0030540 A1* | 2/2004 | Ovil | .................... | G06F 17/2705 704/1 |
| 2007/0250468 A1* | 10/2007 | Pieper | ............... | G06F 17/30867 707/E17.109 |
| 2008/0016240 A1* | 1/2008 | Balandin | .......... | G06F 17/30094 709/238 |
| 2008/0294423 A1* | 11/2008 | Castellani | .......... | G06F 11/0733 704/4 |
| 2009/0070103 A1* | 3/2009 | Beggelman | ............. | G06F 17/27 704/9 |
| 2009/0077069 A1* | 3/2009 | Polanyi | ............. | G06F 17/30622 707/E17.002 |
| 2009/0077095 A1* | 3/2009 | Imai | ..................... | G06Q 10/107 707/E17.032 |
| 2009/0248399 A1* | 10/2009 | Au | .......................... | G06F 17/27 704/9 |
| 2009/0307598 A1* | 12/2009 | Giles | ....................... | G06Q 10/10 715/738 |
| 2009/0327513 A1 | 12/2009 | Guo et al. | | |
| 2011/0040553 A1* | 2/2011 | Sasivarman | ........ | G06F 17/2785 704/9 |
| 2011/0082811 A1* | 4/2011 | Whitehouse | ........... | G06Q 10/08 705/333 |
| 2011/0184740 A1 | 7/2011 | Gruenstein et al. | | |
| 2011/0320187 A1* | 12/2011 | Motik | .................... | G06F 17/278 704/9 |
| 2012/0216114 A1* | 8/2012 | Privault | ............... | G06F 3/04883 715/702 |
| 2012/0290289 A1* | 11/2012 | Manera | ............. | G06F 17/30719 704/9 |
| 2013/0007036 A1* | 1/2013 | Childs | ............... | G06F 17/30997 707/769 |
| 2014/0136188 A1* | 5/2014 | Wroczynski | ........ | G06F 17/2872 704/9 |
| 2014/0156282 A1* | 6/2014 | Madere | .................. | G06F 17/27 704/275 |
| 2014/0163959 A1* | 6/2014 | Hebert | .............. | G06F 17/30684 704/9 |
| 2014/0258314 A1 | 9/2014 | Boudreau et al. | | |
| 2014/0280314 A1* | 9/2014 | Coleman | .......... | G06F 17/30587 707/769 |
| 2014/0282030 A1* | 9/2014 | Bhatnagar | ............. | G06F 3/0484 715/738 |
| 2014/0377735 A1* | 12/2014 | Byron | ...................... | G09B 7/02 434/362 |
| 2015/0081281 A1* | 3/2015 | Bustelo | ............... | G06F 17/2735 704/10 |
| 2015/0100578 A1* | 4/2015 | Rosen | ............... | G06F 17/30598 707/737 |
| 2015/0100943 A1* | 4/2015 | Gabel | .................... | G06Q 30/02 717/106 |
| 2015/0172294 A1* | 6/2015 | Bittner | ................ | G06F 21/6245 726/4 |
| 2016/0048500 A1* | 2/2016 | Hebert | .................. | G06F 17/243 704/9 |
| 2016/0098988 A1* | 4/2016 | Goussard | ................ | G10L 15/18 704/257 |
| 2016/0154783 A1* | 6/2016 | Hebert | ................ | G06F 17/2705 707/755 |
| 2016/0350280 A1* | 12/2016 | Lavallee | ............... | G06F 17/277 704/9 |
| 2017/0193387 A1* | 7/2017 | Lavallee | ................ | G06N 7/005 704/9 |

OTHER PUBLICATIONS

Laurence Danlos & Adil El Ghali—"A complete integrated NLG system using AI and NLU tools"—Published in: Proceeding COLING '02 Proceedings of the 19th international conference on Computational linguistics—vol. 1—pp. 1-7—Taipei, Taiwan—Aug. 24-Sep. 1, 2002.*

Kargin A.A. & Paramonov A.I.—"Intellectual Search Systems Based on the Model of Natural Language Understanding"—Published in: Intelligent Data Acquisition and Advanced Computing Systems: Technology and Applications, 2005. IDAACS 2005. IEEE Sep. 5-7, 2005 pp. 1-5 (150-154).*

"Stanford Named Entity Recognizer (NER)," The Stanford NLP (Natural Language Processing) Group, accessed Apr. 1, 2015, from http://nlp.stanford.edu/software/CRF-NER.shtml, 4 pages.

Finkel, et al, "Incorporating Non-local Information into Information Extraction System by Gibbs Sampling," Stanford University, 2005, accessed Apr. 1, 2015 from <http://nlp.stanford.edu/~manning/papers/gibbscrf3.pdf>, 8 pages.

Finkel, Jenny Rose, "Named Entity Recognition and the Stanford NER Software," Stanford University, Mar. 9, 2007, accessed Apr. 1, 2015 from <http://nlp.stanford.edu/software/jenny-ner-2007.pdf>, 4 pages.

Nisar, et al., "Scaling Parallel I/O Performance through I/O Delegate and Caching System," Elecrical Engineering and Computer Science Department Northwestern University, Nov. 2008, accessed Apr. 1, 2015 from, <https://trac.mcs.anl.gov/projects/iofsl/export/643becef3424345d9d3891e1bb6878d603ac53e9/papers/a9-nisar.pdf>, 12 pages.

Nisar, et al., "Delegation-based I/O Mechanism for High Performance Computing Systems," Electrical Engineering and Computer Science Department Northwestern University, Parallel and Distributed Systems, IEEE Transactions on Parallel and Distributed Systems (TPDS), vol. 23, Issue 2, Jun. 9, 2011, accessed Apr. 1, 2015 from <http://www.ece.northwestern.edu/~choudhar/Publications/DelegationBasedIOMechanismHighPerformanceComputingSystems.pdf>, 9 pages.

Mar. 21, 2016 (WO) International Search Report and Written Opinion—App. PCT/US2015/062886.

* cited by examiner

Contents of Cache 206 After Step 716

| Key | Value |
|---|---|
| 1 | QI = dial:contact<br>Parse = "call [contact]"<br>NE = [contact = local_contact] |
| Parse = "call [local_contact]"<br>NE = [local_contact = "home depot"] | |

*FIG. 11*

Contents of Cache 206 After Step 816

| Key | Value |
|---|---|
| 1 | QI = dial:contact<br>Parse = "call [contact]"<br>NE = [contact = local_contact] |
| Parse = "call [local_contact]"<br>NE = [local_contact = "home depot"] | |
| 2 | QI = dial:business<br>Parse = "call [business]"<br>NE = [business = "home depot"] |
| Parse = "call home depot"<br>NE = [ ] | |

*FIG. 12*

Contents of Cache 206 at Step 910

| Key | Value |
|---|---|
| 1 | Parse = "call [local_contact]"<br>NE = [local_contact = "home depot"] | QI = dial:contact<br>Parse = "call [contact]"<br>NE = [contact = local_contact] |
| 2 | Parse = "call home depot"<br>NE = [ ] | QI = dial:business<br>Parse = "call [business]"<br>NE = [business = "home depot"] |

*FIG. 13*

Contents of Cache 206 at Step 1010

| Key | Value |
|---|---|
| 1 | Parse = "call [local_contact]"<br>NE = [local_contact = "home depot"] | QI = dial:contact<br>Parse = "call [contact]"<br>NE = [contact = local_contact] |
| 2 | Parse = "call home depot"<br>NE = [ ] | QI = dial:business<br>Parse = "call [business]"<br>NE = [business = "home depot"] |

*FIG. 14*

NATURAL LANGUAGE UNDERSTANDING CACHE

FIELD

This application generally relates to computers and computer software. More specifically, aspects described herein relate to natural language processing software applications, and to language parsing and identification for use in a natural language understanding (NLU) cache.

BACKGROUND

Natural Language Processing (NLP) and Natural Language Understanding (NLU) involve using computer processing to extract meaningful information from natural language inputs (e.g., spoken or text-based strings of English or some other language). More applications are using NLP and NLU to interact with users. NLU processing requires an abundance of computing resources and may have an adverse effect on computing devices performing this processing.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In view of an identified need to decrease the amount of NLU processing, while still providing accurate NLU results, one or more aspects of the disclosure provide for a method that may include receiving, by a device, a first natural language input comprising a set of one or more terms; and parsing the first natural language input to determine a first pretag result, the first pretag result comprising at least a first string comprising at least one term from the set of one or more terms. The method may also include determining whether the first pretag result corresponds to at least one key stored in a cache; if the first pretag result corresponds to at least one key stored in the cache, retrieving, from the cache, one or more cached NLU results corresponding to the at least one key; and if the first pretag result does not correspond to at least one key stored in the cache: determining, based on the set of one or more terms, a first NLU result corresponding to the first natural language input, the first NLU result comprising an intent associated with the first natural language input; storing, in the cache, the first NLU result; and storing, in the cache, a first key comprising the first pretag result, the first key corresponding to the first NLU result.

One or more aspects of the disclosure provide for a system that includes at least one processor; and at least one memory storing instructions that, when executed by the at least one processor, cause the system to perform one or more steps. The steps the system may perform may include receiving, by a device, a first natural language input comprising a set of one or more terms; and parsing the first natural language input to determine a first pretag result, the first pretag result comprising at least a first string comprising at least one term from the set of one or more terms. The steps may also include determining whether the first pretag result corresponds to at least one key stored in a cache; if the first pretag result corresponds to at least one key stored in the cache, retrieving, from the cache, one or more cached NLU results corresponding to the at least one key; and if the first pretag result does not correspond to at least one key stored in the cache: determining, based on the set of one or more terms, a first NLU result corresponding to the first natural language input, the first NLU result comprising an intent associated with the first natural language input; storing, in the cache, the first NLU result; and storing, in the cache, a first key comprising the first pretag result, the first key corresponding to the first NLU result.

One or more aspects of the disclosure provide for one or more non-transitory computer-readable storage media having instructions stored thereon, that when executed by one or more processors, may cause the one or more processors to perform steps. The steps that the one or more processors perform may include receiving, by a device, a first natural language input comprising a set of one or more terms; and parsing the first natural language input to determine a first pretag result, the first pretag result comprising at least a first string comprising at least one term from the set of one or more terms. The steps may also include determining whether the first pretag result corresponds to at least one key stored in a cache; if the first pretag result corresponds to at least one key stored in the cache, retrieving, from the cache, one or more cached NLU results corresponding to the at least one key; and if the first pretag result does not correspond to at least one key stored in the cache: determining, based on the set of one or more terms, a first NLU result corresponding to the first natural language input, the first NLU result comprising an intent associated with the first natural language input; storing, in the cache, the first NLU result; and storing, in the cache, a first key comprising the first pretag result, the first key corresponding to the first NLU result.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 11 depicts an illustrative diagram showing an example cache and contents in accordance with one or more disclosed aspects.

FIG. 12 depicts an illustrative diagram showing an example cache and contents in accordance with one or more disclosed aspects.

FIG. 13 depicts an illustrative diagram showing an example cache and contents in accordance with one or more disclosed aspects.

FIG. 14 depicts an illustrative diagram showing an example cache and contents in accordance with one or more disclosed aspects.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
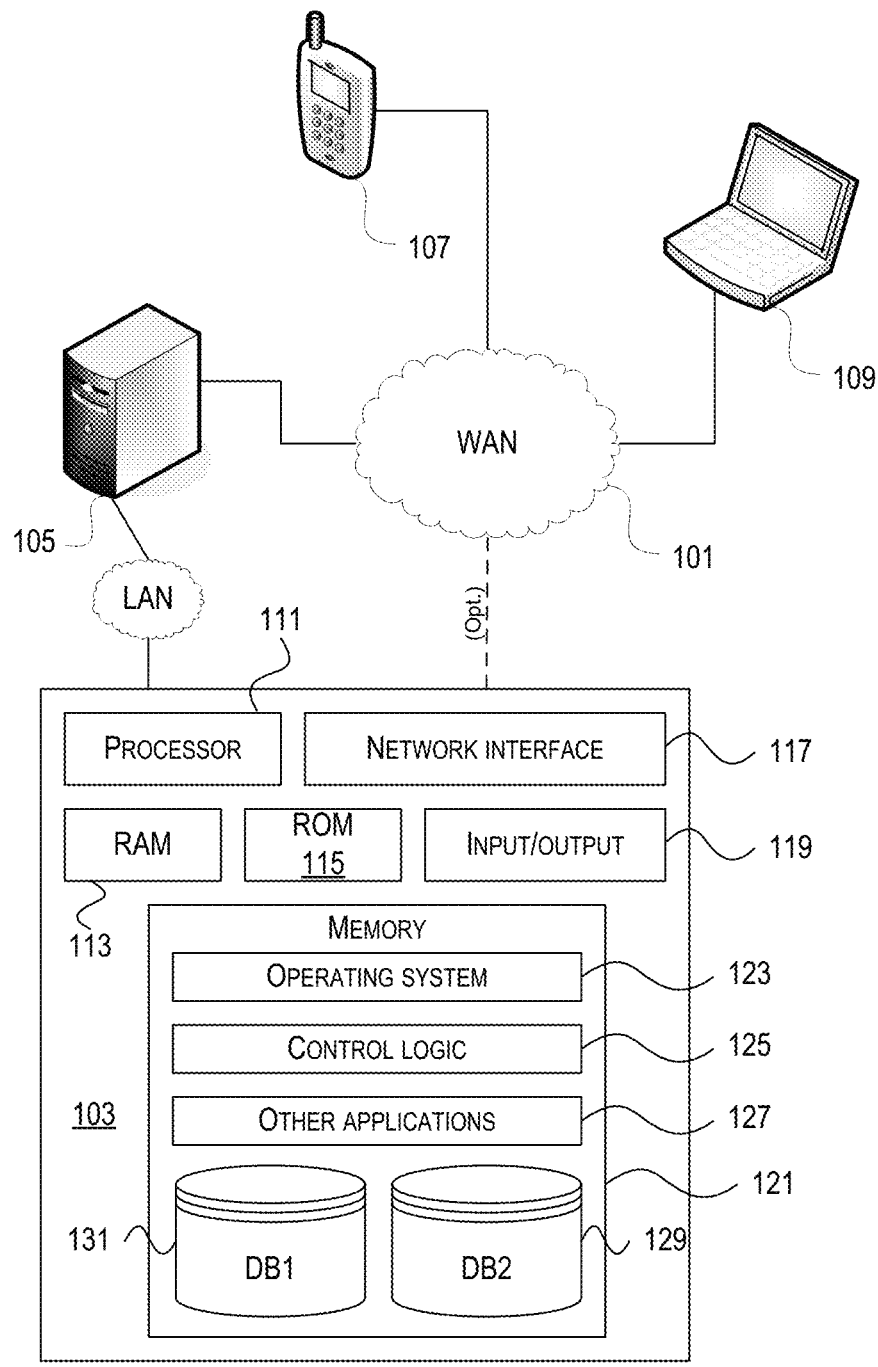
FIG. 1 depicts an illustrative diagram showing an example system in accordance with disclosed aspects.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

Devices 103, 105, 107, 109 may be automatic conversational systems having multiple computer-implemented dialogue components for conducting an automated dialogue process with a user. Devices 103, 105, 107, 109 may allow for a human-machine dialogue arrangement. According to some aspects, Devices 103, 105, 107, 109 may include multiple computer-implemented dialogue components, which may be configured to intercommunicate and use context to narrow down understanding, recognition, and/or reasoning errors. In some embodiments, Devices 103, 105, 107, 109 may detect and/or resolve anaphora based on linguistic cues, dialogue context, and/or general knowledge.

The term "network" as used herein and depicted in the drawings might refer not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with other aspects described herein. The control logic may also be referred to herein as the data server software 125. Functionality of the data server software may be operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

One or more aspects described herein are directed toward natural language understanding. According to disclosed aspects, a text sample may be a string of one or more words and/or terms. A substring may be one or more consecutive words of a string in which the order of the words is preserved. One or more words of a text sample may be hyponyms (relatively low-level concepts) that correspond to or are otherwise associated with one or more hypernyms (relatively high-level concepts). An ontology may define a semantic relationship between hyponyms and hypernyms. A hyponym may be a single word of a text sample or multiple consecutive words of a text sample. It will be appreciated that a hypernym may, in some instances, be a hyponym of another hypernym. For example, "Chicago" may be a hyponym of the hypernym "CITY," which may in turn be a hyponym of the hypernym "LOCATION." Thus, a hypernym may be a category or label attached to and/or otherwise associated with a hyponym. Additional examples will be appreciated with the benefit of this disclosure. A simple hypernym may be a single hypernym, and a complex hypernym may be a concatenation of at least two simple hypernyms. A complex hypernym may include a delimiter (e.g., "&") that separates the concatenated simple hypernyms. A complex hypernym may thus also be referred to as a concatenated hypernym.

One or more aspects described herein are directed toward internal concept mapping. Internal concept mapping may be a mapping of key-value pairs or concepts that maps hyponyms to hypernyms. For example, internal concept mapping may map the names of cities (hyponyms) to the concept "CITY" (a hypernym). In this example, the name of the city may correspond to the key of the mapping, and the concept of "CITY" may correspond to the value of the mapping, (e.g., "New York"→"CITY"). Internal concept mapping may include functionality to search for a key-value pair or concept, add a new key-value pair or concept, and to perform other types of actions associated with mappings that will be appreciated to those skilled in the art.

Disclosed embodiments may be configured to, in operation, annotate text samples and generate annotations for the text samples. Disclosed embodiments may be configured to annotate text samples in an automatic fashion or, additionally or alternatively, in response to input received from a user, i.e., in a manual fashion. Disclosed embodiments may be configured to generate a set of annotation candidates corresponding to possible annotations for a text sample. The set of annotation candidates may include one or more annotation candidates and may be referred to as a list of annotation candidates. Disclosed embodiments may then select one of the annotation candidates as the annotation for the text sample. Selection of an annotation candidate as the annotation for a text sample may be automatically performed or may be performed in response to input received from a user. Disclosed embodiments may, for example, be configured to assign an annotation to a named entity. Disclosed embodiments may generate a list of annotation candidates based on the hypernyms associated with the n-grams of a text sample. Disclosed embodiments may determine the hypernyms that are associated with or otherwise correspond to the n-grams of a text sample based, at least in part, on internal concept mapping, ontology, an external linguistic resource, or a combination thereof.

According to some aspects, some concepts may be both hypernyms and hyponyms. For example, a "JFK New York" concept may be a hyponym of a "LOCATION" concept, which may be in turn a hyponym of an "AIRPORT CITY" concept. Disclosed embodiments may generate this annotations based on relationships defined by ontology. Disclosed embodiments may generate the annotations (e.g., "fly from AIRPORT CITY" instead of "fly from JFK") by associating "JFK" with "AIRPORT" and "New York" with "CITY" based on identified named entities, internal concept mapping, ontology, and key-value pairs.

Aspects of the present disclosure may utilize linguistic resources, such as a database that may define semantic relationships between concepts. For example, an external linguistic resource may thus be a lexical database such as, e.g., WordNet. Other examples of external linguistic resources include dictionaries capable of providing lexicographic data such as, e.g., Wiktionary. The grammar construction system may submit requests to the external linguistic resource, e.g., HyperText Transfer Protocol (HTTP) requests, and receive results in a response, e.g., an HTTP response.

Disclosed embodiments may be implemented via an application on, for example, devices 103, 105, 107, 109. For example, the application may be a speech-based personal assistant application such as SIRI, NINA, Dragon Mobile Assistant, etc. Examples of applications in which such a personal assistant application may be implemented may include text-messaging based applications (e.g., SMS, TMS), email applications, web browsers, word processing applications, and/or any text-based or speech-based application.

The following paragraph lists example acronyms that may be used to describe one or more features disclosed herein.

Figure 2:
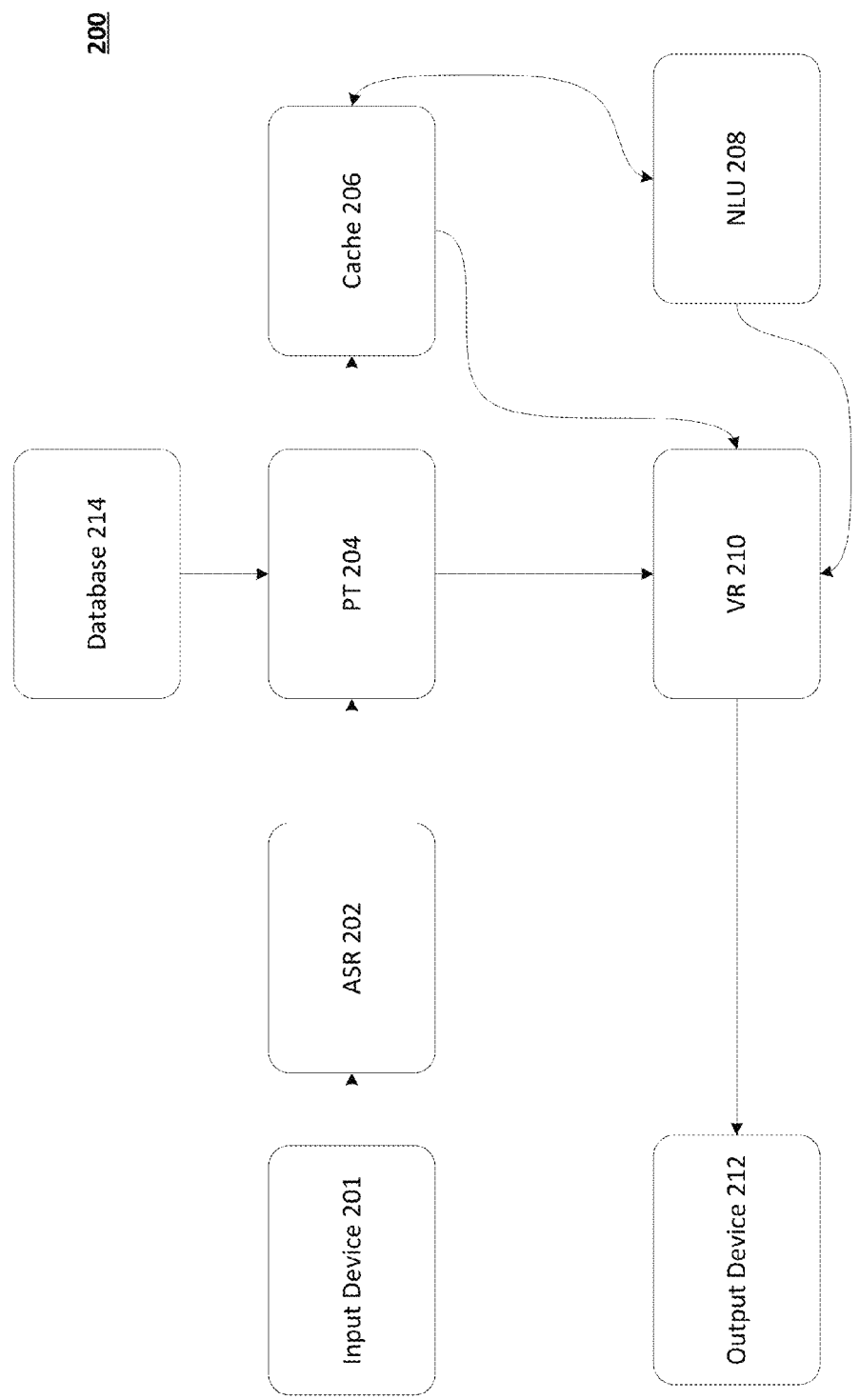
FIG. 2 depicts an illustrative diagram showing an example system and flow process of natural language understanding architecture in accordance with disclosed aspects.

ASR Automatic Speech Recognition Engine
PT Pre-Tagging Engine
NLU Natural Language Understanding Engine
VR Variable Resolver
NE Named Entity
QI Query Intent FIG. 2 is an illustrative system 200 that may implement one or more features described herein. System 200 may be an automatic conversational system having multiple computer-implemented dialogue components for conducting an automated dialogue process with a user or device. System 200 may allow for a human-machine dialogue arrangement. According to some aspects, the arrangement may include multiple computer-implemented dialogue components, which may be configured to intercommunicate and use context to narrow down understanding, recognition, and/or reasoning errors. In some embodiments, the system may detect and/or resolve anaphora based on linguistic cues, dialogue context, and/or general knowledge. Components of system 200 may be similar to and/or the same as components of system 100, as shown in FIG. 1. Components of system 200 may be located on or at one or more of the components of system 100, such as devices 103, 105, 107, 109. Components of system 200 may be connected via one or more networks (e.g., LAN, WAN, etc.).

System 200 may comprise an input device 201, which may be, for example, a microphone, keyboard, mouse, touch display, motion sensor, camera, and the like. According to some aspects, input device 201 may deliver output prompts to a human user (or other entity/device capable of inputting/producing speech/word inputs) and may receive dialogue inputs including speech inputs from the user. The input device 201 may reside on a computing device, such as a mobile device, laptop, embedded platform and the like. The input device 201 may display a user interface, provide/receive touch input, and the like.

System 200 may comprise an automatic speech recognition (ASR) engine 202, which may be a software and/or hardware component of system 200, and may process inputs (e.g., speech and/or text inputs) to determine corresponding sequences of representative text words. For example, the ASR 202 may produce one or more text-based transcriptions or queries of a speech input, which may be composed of one or more terms, words, numbers, or other text.

System 200 may comprise a pre-tagging (PT) engine 204, which may perform pre-processing/pre-tagging on a transcription or query. PT 204 may leverage/process device and/or user metadata that may be stored in a database and/or on the device. For example, PT 204 may parse a string of words (e.g., using grammars, named entity processing, and/or internal concept processing) to determine whether any of the words in the string match any of the user metadata, such as a name in a contact list (e.g., stored in a database, such as database 214 discussed below in more detail). Thus, if a user states/inputs "call mom," PT 204 may parse the statement "call mom" to determine if mom is in the user's contact list. In such a case, PT 204 may identify "mom" as a named entity in the query of words. According to some aspects, PT 204 may annotate the identified named entity with a broader category. In such a case, "mom" may be a hyponym, and "local_contact" or "user_contact" may be a hypernym of the hyponym "mom." Thus, a pre-tagging result may comprise the parsed string of "call [local_contact]" and the named entity of [local_contact="mom"]. The PT 204 may also perform other operations, such as information retrieval, syntactic analysis, and the like. Pre-tagging will be discussed below in more detail.

System 200 may comprise one or more caches 206, which may be a storage memory and/or device, which may be used to store results output by PT 204 and results output by natural language understanding (NLU) engine 208 (discussed below). Cache 206 may store the results output by PT 204 as keys, and may store results output by NLU 208 as corresponding values for those keys. Each key may correspond to a value, and each value may correspond to a key. These keys and values may be stored, for example, in a table. Cache 206 may be a global cache, such that a plurality of devices may retrieve information to and/or transmit information from cache 206. For example, cache 206 may be located at a remote location, such as a server farm and/or a business location. Cache 206 may also be located locally, such as on a user device. For example, a local cache may be accessed by the user device on which the cache is located. Cache 206 may also be local and remote (e.g., one or more local caches and one or more remote caches). Cache 206 may be configurable and/or aged. For example, the elements and/or entries (e.g., keys and values) may be configured to time out and/or expire at some time and/or after some time period, which may be predetermined or dynamically determined. For example, an entry may expire after a day or a few hours, but may also be extended depending on if the amount of times the entry is used or a frequency of use associated with the entry. In another example, the cache 206 may be preconfigured with a key and/or value, such that a key and/or value may be added to the cache 206. According to some aspects, there may be a plurality of caches 206, which may store a plurality of results output by PT 204 as keys, and may store a plurality of results output by NLU 208 as corresponding values for these keys.

System 200 may comprise a natural language understanding (NLU) engine 208, which may be a software and/or hardware component of system 200, and may process a query of text words to determine a result for each semantic interpretation. For example, the NLU 208 may parse queries and may produce one or more semantic interpretations for each of the queries. NLU 208 may resolve any anaphora that may be present in the semantic interpretations. NLU 208 may produce results that may include query intent, which may identify an intention of the query of words received from a user. Each query may have one query intent. In the above example of the user stating "call mom," and mom is on the user's contact list, NLU 208 may determine that the query intent of the input "call mom" may be "dial:contact." NLU 208 may determine this intention because mom is on the user's contact list, and the processing of the word "call" might correspond to the intention of dial. According to some aspects, if NLU 208 determines the intention to be dial:contact, the application may initiate a call to a contact (e.g., mom). Thus, a query intent may correspond to a specific behavior of the accessed/controlled application (e.g., personal assistant application such as SIRI, NINA, Dragon Mobile Assistant, etc.). According to some aspects, after the NLU 208 determines a query intention, the application may present a list of items corresponding to the query intention from which a user may select, such as a list of businesses to call, before initiating an action. According to some aspects, determining the query intent may consume a great deal of processing resources (e.g., be computationally expensive). The NLU result may also include a named entity, which may be a fragment of a query (e.g., one or more words of a query) that may represent the target of the action specified by the query intent. In the above example, "local_contact" may be a named entity because "local_contact" is the entity in which "dial:contact" is targeting. According to some aspects, NLU 208 may generate a list of named entities for each query or for a plurality of queries. The NLU result may also include a parse structure, which may determine the structure of the query in which the named entity is embedded.

System 200 may comprise a variable resolver (VR) 210. The VR 210 may obtain the pretag result from PT 204 and/or the NLU result from NLU 208 and may resolve the information contained in each result to produce a final NLU result. Similar to the NLU result generated by NLU 208, the final NLU result may include a query intent, a named entity, and a parse. In the above example, of the user inputting "call mom" and mom being on the user's contact list, the PT result may include: Parse="call [local_contact]", Named Entity (NE)=[local_contact="mom"]. The NLU result may include: QI=dial:contact, Parse="call [contact]", NE= [contact=local_contact]. In such an example, the VR 210 may resolve contact=local_contact with local_contact="mom." Thus, VR 210 may produce a final NLU result of QI=dial:contact, Parse="call [contact]", NE= [contact="mom"]. After VR 210 determines a final NLU result, the application may perform an action associated with the final NLU result, which may be based on the final NLU result's QI. In the above example, the application might initiate a telephone call (e.g., dial) to the "mom" contact (e.g., via a telephone application).

System 200 may include an output device 212, which may be, for example, a display device, a speaker, and the like. The output device 212 may display one or more final NLU results in a list. According to some embodiments, a user may select one of these final NLU results to implement. For example, output device 212 may present a list of businesses and their telephone numbers to a user.

System 200 may include a database 214 that may store information such as metadata associated with a device or a user. This information (metadata) may be collected (e.g., previously) by an entity (e.g., a computing device, person, business, enterprise, and/or organization) that may own, control, and/or be otherwise associated with the application, device, and/or user. This information may be logged by and/or transmitted to a server 214 and/or database 214 whenever a user uses an application (e.g., a personal assistant application) in accordance with disclosed aspects. This information may include a contacts list, a favorites list (e.g., favorite websites, telephone number, apps, restaurants, businesses, locations, etc.), a geolocation of a device or user, music list (e.g., music that may be stored on and/or linked to by the device), video list (e.g., video that may be stored on and/or linked to by the device, media list (e.g., media that may be stored on and/or linked to by the device), and the like. This information may be periodically updated, such as whenever a user or device updates a playlist of songs or adds a contact to a contacts list.

According to some aspects, a dialogue manager may generate output prompts and/or respond to the semantic interpretations so as to manage a dialogue process with the human user. The dialogue components may share context information with each other using a common context sharing mechanism such that the operation of each dialogue component reflects available context information.

FIGS. 3-6 illustrate examples systems and process flows in accordance with one or more features described herein. For example, the systems and processes illustrated in FIGS. 3-6 may be directed to performing one or more disclosed aspects without a cache, such as cache 206. The processes illustrated in FIGS. 3-6 may be performed in sequential order, such that one process may occur after another process. In one or more embodiments, the processes illustrated in FIGS. 3-6 and/or one or more steps thereof may be performed by a computing device, such as devices 103, 105, 107, and/or 109. In other embodiments, the processes illustrated in FIGS. 3-6 and/or one or more steps thereof may be embodied in computer-executable instructions that are stored in a computer-readable medium, such as a non-transitory computer-readable memory. Any of the disclosed steps in FIGS. 3-6 (and/or associated descriptions herein) may be omitted, be performed in other than the recited order, repeated, and/or combined.

Figure 3:
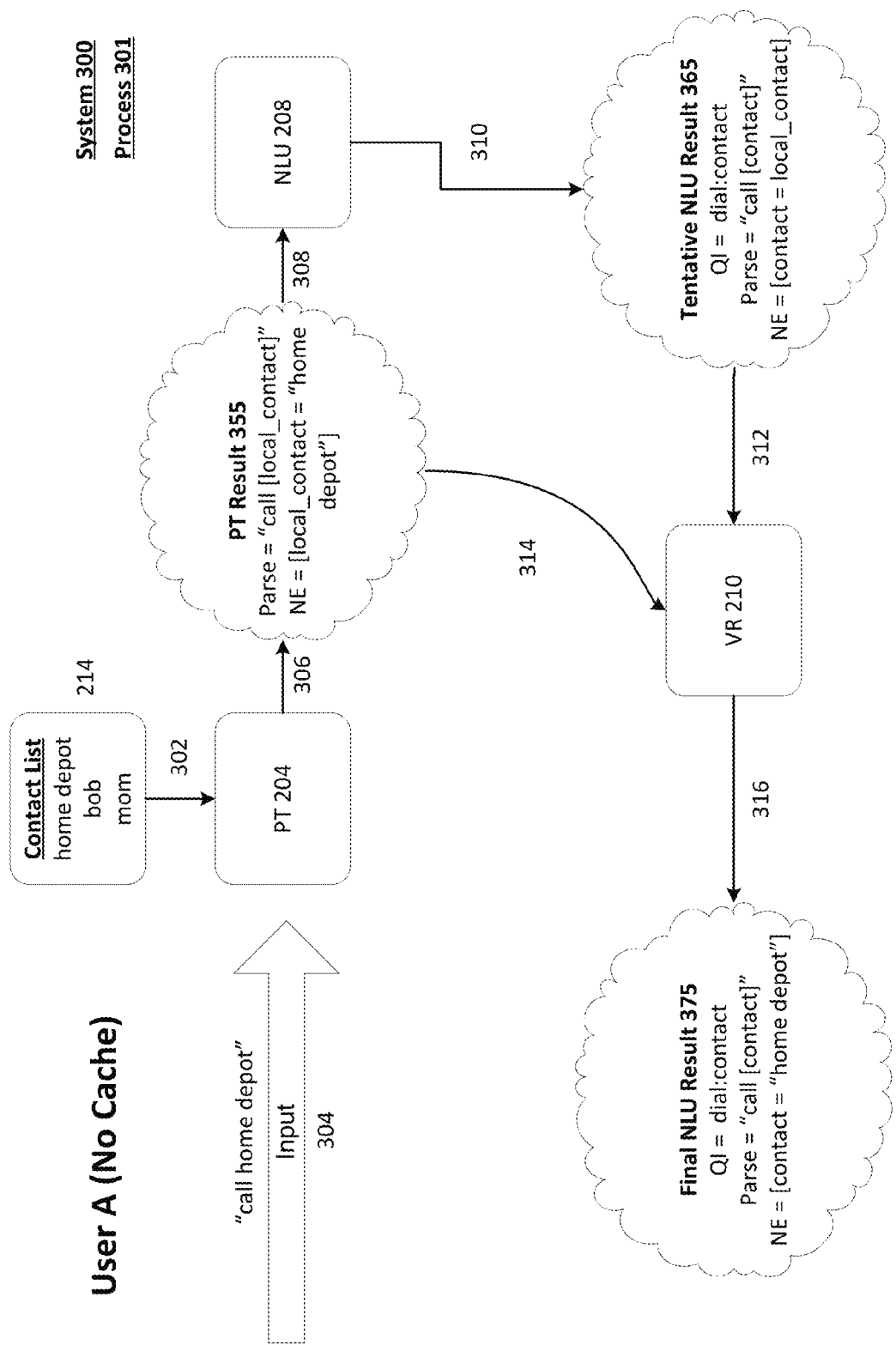
FIG. 3 depicts an illustrative diagram showing an example system and flow process of pre-tagging results without a cache in accordance with disclosed aspects.

FIG. 3 illustrates an example system 300 illustrating a process flow 301 in accordance with one or more features described herein. System 300 may be an automatic conversational system that may be similar to, be the same as, or include system 200 or portions thereof. For example, system 300 may include an input device and ASR (not shown), a PT 204, a NLU 208, a VR 210, and a database 214 (which may include metadata). Process 301 may be implemented with one or more components of system 300. Process 301 may be implemented for a user A and/or a device associated with user A.

Process 301 may begin with step 302, in which the PT 204 may retrieve and/or access information from the database 214. This information may include any metadata that was previously and/or is currently being stored/retrieved by database 214 from a user (e.g., user A) and/or device (e.g., a device associated with user A, such as devices 103, 105, 107, and/or 109). As shown in FIG. 3, this information may include a contacts list, which may include various types of information for each contact listed on the contact list, such as a name, telephone number, email address, physical address/location, handle name, and the like. According to some aspects, the database 214 may be part of a server or other computing system. According to some aspects, the database 214 may be stored at a site remote from the device (or user), such as in an enterprise server. According to some aspects, the database may be stored in a local memory of the device. In one example, the PT 204 may retrieve information, such as a contact's name and/or telephone number, from the database 214 using a user or device ID. For example, the information stored in the database 214 may be stored according to user and/or device, and PT 204 may retrieve information (e.g., metadata) associated with a user and/or device with the user ID or device ID. As shown in FIG. 3, user A's contact list may include the contacts of home depot, bob, and mom.

At step 304, PT 204 may retrieve an input or query that may be composed of one or more terms, words, numbers, and the like. This input may be transmitted by an ASR, such as ASR 202. For example, the query may be derived via speech recognition, in which a speech input may be rendered into text. According to some aspects, the input may be transmitted by an input device or other computing device. According to some aspects, the input may be a text based input. As shown in FIG. 3, the input in this example may comprise the query "call home depot."

At step 306, after receiving the input the PT 204 may analyze the query. For example, the PT 204 may determine one or more named entities in the query using internal concept mapping. These named entities may be formatted into hypernyms and/or hyponyms. For example, using the information/metadata from database 214, the PT 204 may implement a named entity recognition algorithm to determine that the query contains one or more terms (e.g., a named entity) that may correspond (e.g., match) to information in the database associated with user A (e.g., a contact on user A's contact list). In such a case, the user may have the telephone number for the user's wife who works at a local home depot programmed into his phone, and may just label the telephone number as "home depot" in his contacts list. In this example, PT 204 may determine that a named entity within the query is "home depot." PT 204 may also determine that this identified named entity (or some portion thereof) is in user A's contact list. PT 204 may then associate this identified named entity (home depot) with the source of the match (local contact). According to some aspects, the named entity may be a hyponym of the source, such that the source may identify a category for the named entity. PT 204 may then produce and/or store a value for the named entity in a result 355. For example, the result 355 may include the data result of NE=[local_contact="home depot"]. According to some aspects, PT 204 may search the database 214 for any metadata that may correspond and/or match all or a portion of an identified named entity (e.g., via a string matching algorithm). The PT 204 may also process the query by using a string matching and/or grammar-based approaches (e.g., grammars and/or inventories may be derived from the user's metadata). For example, PT 204 may determine a parse structure, which may determine the structure of the query in which the named entity is embedded. For example, for the input "call home depot," the PT 204 may determine that the named entity "home depot" is on user A's contact list, and may replace (e.g., annotate, as discussed above) the named entity in the query with an associated hyponym and/or category (e.g., local_contact). Accordingly, the result 355 may also include the data result of Parse="call [local_contact]".

At step 308, the result 355 and/or original query (e.g., from step 304) may be transmitted to the NLU 208. At step 310, the NLU 208 may process the query of text words to determine a result 365. This result 365 may include a named entity item, a parse item, and a query intent item. For example, the NLU 208 may determine a named entity for the query "call [local_contact]," which is the Parse item in result 355. NLU 208 may determine that the named entity is "local_contact" and may then determine a category and/or hypernym for this named entity. In this case, "local_contact" may be a hyponym of the hypernym "contact." According to some aspects, the hypernym contact may have one or more other hyponyms, such as remote_contact (e.g., a contact that might not be stored on user A's telephone). Accordingly, the result 365 may include the data result of NE=[contact=local_contact]. The NLU 208 may determine a parse structure, which may determine the structure of the query in which the named entity is embedded. For example, for the input "call [local_contact]," the NLU 208 may determine that the named entity "[local_contact]" is in the category of contact, and may replace (e.g., annotate, as discussed above) the named entity in the query with an associated hyponym and/or category (e.g., contact). Accordingly, the result 365 may also include the data result of Parse="call [contact]. NLU 208 may also determine a query intent. For example, the natural language processing of the word "call" might correspond to the intention of dial, and because NLU 208 has identified the named entity as "contact," the result 365 may include the query intent of "dial: contact". According to some aspects, determining the query intent or any other annotations may consume a great deal of processing resources (e.g., be computationally expensive).

At step 312, the NLU 208 may transmit the result 365 to the VR 210, and at step 314, the PT 204 may transmit the result 355 to VR 210. At step 316, VR 210 may then resolve the information contained in each result to produce a final NLU result 475, which may include a query intent, a named entity, and a parse. As shown in FIG. 3, the PT result 355 may include: Parse="call [local_contact]", Named Entity (NE)=[local_contact="home depot"]. The NLU result 365 may include: QI=dial:contact, Parse="call [contact]", NE=[contact=local_contact]. In such an example, the VR 210 may resolve contact=local_contact with local_contact="home depot." Thus, VR 210 may produce a final NLU result 375 of QI=dial:contact, Parse="call [contact]", NE=[contact="home depot"].

Figure 4:
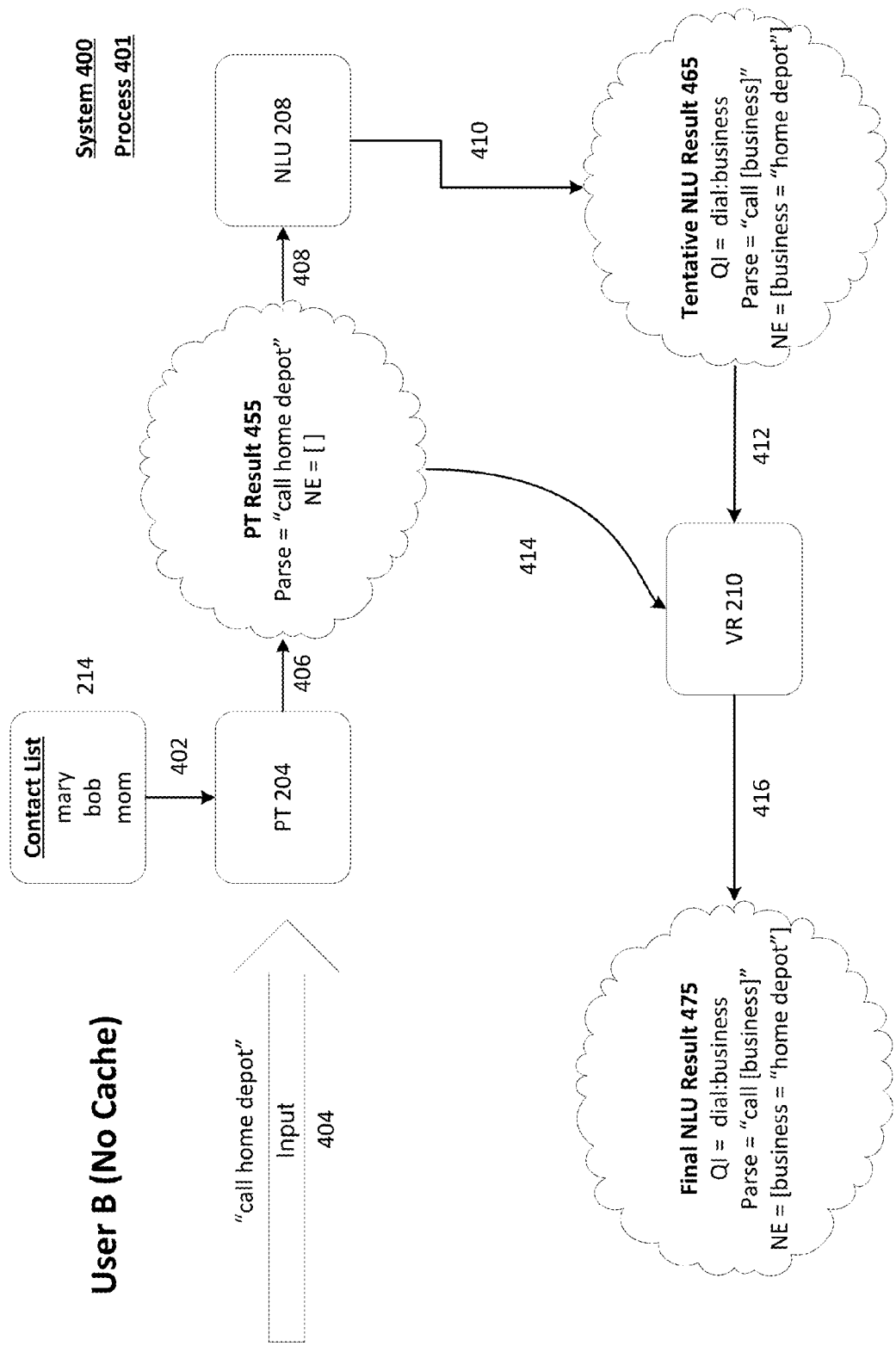
FIG. 4 depicts an illustrative diagram showing an example system and flow process of pre-tagging results without a cache in accordance with disclosed aspects.

FIG. 4 illustrates an example system 400 illustrating a process flow 401 in accordance with one or more features described herein. System 400 may be an automatic conversational system that may be similar to, be the same as, or include systems 200 and/or 300, or portions thereof. For example, system 400 may include an input device and ASR (not shown), a PT 204, a NLU 208, a VR 210, and a database 214 (which may include metadata). Process 401 may be implemented with one or more components of system 400. Process 401 may be implemented for a user B and/or a device associated with user B.

Process 401 may begin with step 402, in which the PT 204 may retrieve and/or access information from the database 214. This information may include any metadata that was previously and/or is currently being stored/retrieved by database 214 from a user (e.g., user B) and/or device (e.g., a device associated with user B, such as devices 103, 105, 107, and/or 109). As shown in FIG. 4, this information may include a contacts list, which may include various types of information for each contact listed on the contact list, such as a name, telephone number, email address, physical address/location, handle name, and the like. In one example, the PT 204 may retrieve information, such as a contact's name and/or telephone number, from the database 214 using a user or device ID. For example, the information stored in the database 214 may be stored according to user and/or device, and PT 204 may retrieve information (e.g., metadata) associated with a user and/or device with the user ID or device ID. As shown in FIG. 4, user B's contact list may include the contacts of mary, bob, and mom.

At step 404, PT 204 may retrieve an input or query that may be composed of one or more terms, words, numbers, and the like. This input may be transmitted by an ASR, such as ASR 202. According to some aspects, the input may be a text based input. As shown in FIG. 4, the input in this example may comprise the query "call home depot." According to some aspects, PT 204 shown in FIG. 4 may be the same PT 204 as shown in FIG. 3. For example, user A and user B may operate the same device, but may be separately logged on to the device such that PT 204 retrieves information associated with a respective user from database 214 whenever that user is logged on. According to some aspects, PT 204 in FIG. 4 may be a separate PT 204 as shown in FIG. 3. For example, user A may operate a first device that may include a first PT 204, and user B may operate a second device that may include a second PT 204. Similarly, other components (e.g., NLU 208, VR 210, database, 214, etc.) of system 400 may be the same as or separate from one or more of the components of system 300.

At step 406, after receiving the input the PT 204 may analyze the query. For example, the PT 204 may determine one or more named entities in the query using internal concept mapping. These named entities may be formatted into hypernyms and/or hyponyms. For example, using the information/metadata from database 214, the PT 204 may implement a named entity recognition algorithm to determine that the query contains one or more terms (e.g., a named entity) that may not correspond (e.g., no match) to information in the database associated with user B. In this example, PT 204 may determine that "home depot" might not correspond to a contact in user B's contact list. Because there is no named entity match to user B's contact list, the NE item in result 455 is blank (NE=[ ]). The result 455 may also include the data result of Parse="call home depot," because there might not be any annotation performed due to there being no match in user B's contact list.

At step 408, the result 455 and/or original query (e.g., from step 404) may be transmitted to the NLU 208. At step 410, the NLU 208 may process the query of text words to determine a result 465. This result 465 may include a named entity item, a parse item, and a query intent item. For example, the NLU 208 may determine a named entity for the query "call home depot," which is the Parse item in result 455. NLU 208 may determine that the named entity is "home depot" and may then determine a category and/or hypernym for this named entity. In this case, "home depot" may be a hyponym of the hypernym "business." Accordingly, the result 465 may include the data result of NE= [business="home depot"]. The NLU 208 may determine a parse structure, which may determine the structure of the query in which the named entity is embedded. For example, for the input "call home depot," the NLU 208 may determine that the named entity "home depot" is in the category of business, and may replace (e.g., annotate, as discussed above) the named entity in the query with an associated hyponym and/or category (e.g., business). Accordingly, the result 465 may also include the data result of Parse="call [business]." NLU 208 may also determine a query intent. For example, the natural language processing of the word "call" might correspond to the intention of dial, and because NLU 208 has identified the named entity as "business," the result 465 may include the query intent of "dial:business". In such a case, the NLU 208 may look to a phone book, such as the yellow pages, or on the internet to determine a phone number for such a business (e.g., a local home depot). According to some aspects, determining the query intent may consume a great deal of processing resources (e.g., be computationally expensive).

At step 412, the NLU 208 may transmit the result 465 to the VR 210, and at step 414, the PT 204 may transmit the result 455 to VR 210. At step 416, VR 210 may then resolve the information contained in each result to produce a final NLU result 475, which may include a query intent, a named entity, and a parse. As shown in FIG. 4, because there was no NE item in result 455, the final NLU result 475 may be the same as result 465.

Figure 5:
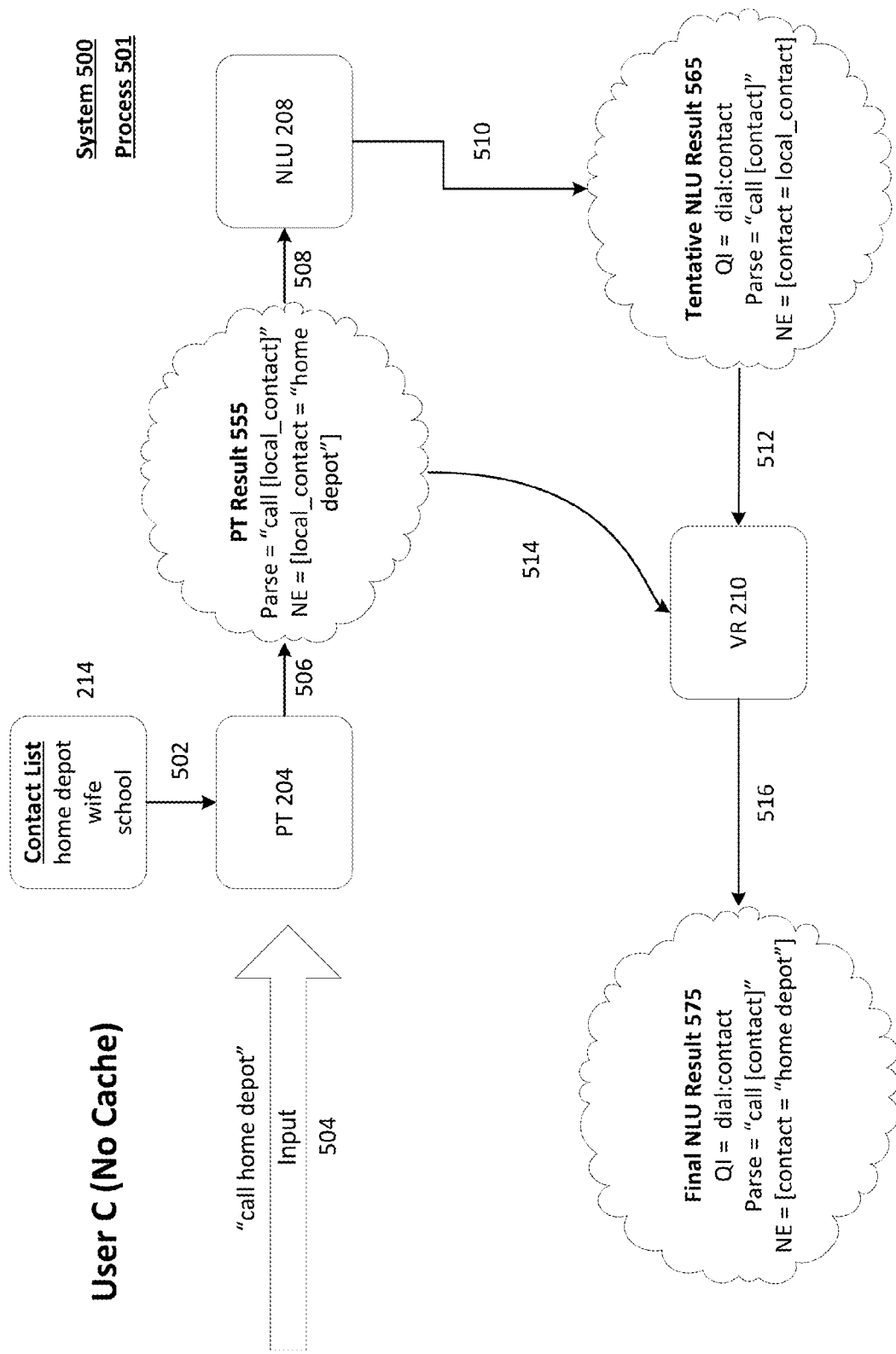
FIG. 5 depicts an illustrative diagram showing an example system and flow process of pre-tagging results without a cache in accordance with disclosed aspects.

FIG. 5 illustrates an example system 500 illustrating a process flow 501 in accordance with one or more features described herein. System 500 may be an automatic conversational system that may be similar to, be the same as, or include systems 200 and/or 300, or portions thereof. For example, system 500 may include an input device and ASR (not shown), a PT 204, a NLU 208, a VR 210, and a database 214 (which may include metadata). Process 501 may be implemented with one or more components of system 300. Process 501 may be implemented for a user C and/or a device associated with user C. Process 501 is very similar to process 301, with a difference being the user's contact list contains home depot, wife, and school. Because the input/query (call home depot) is the same as in process 301 and user C's contact list contains "home depot," the steps of process 501 (steps 502, 504, 508, 510, 512, 514, and 516) may be substantially similar to and/or the same as the steps of process 301 (steps 302, 304, 308, 310, 312, 314, and 316). Also, the results 555, 565, and 575 may be substantially similar to and/or the same as results 355, 365, and 375. According to some aspects, PT 204 shown in FIG. 5 may be the same PT 204 as shown in FIG. 3. For example, user A and user C may operate the same device, but may be separately logged on to the device such that PT 204 retrieves information associated with a respective user from database 214 whenever that user is logged on. According to some aspects, PT 204 in FIG. 5 may be a separate PT 204 as shown in FIG. 3. For example, user A may operate a first device that may include a first PT 204, and user C may operate a second device that may include a second PT 204. Similarly, other components (e.g., NLU 208, VR 210, database 214, etc.) of system 500 may be the same as or separate from one or more of the components of system 300.

Figure 6:
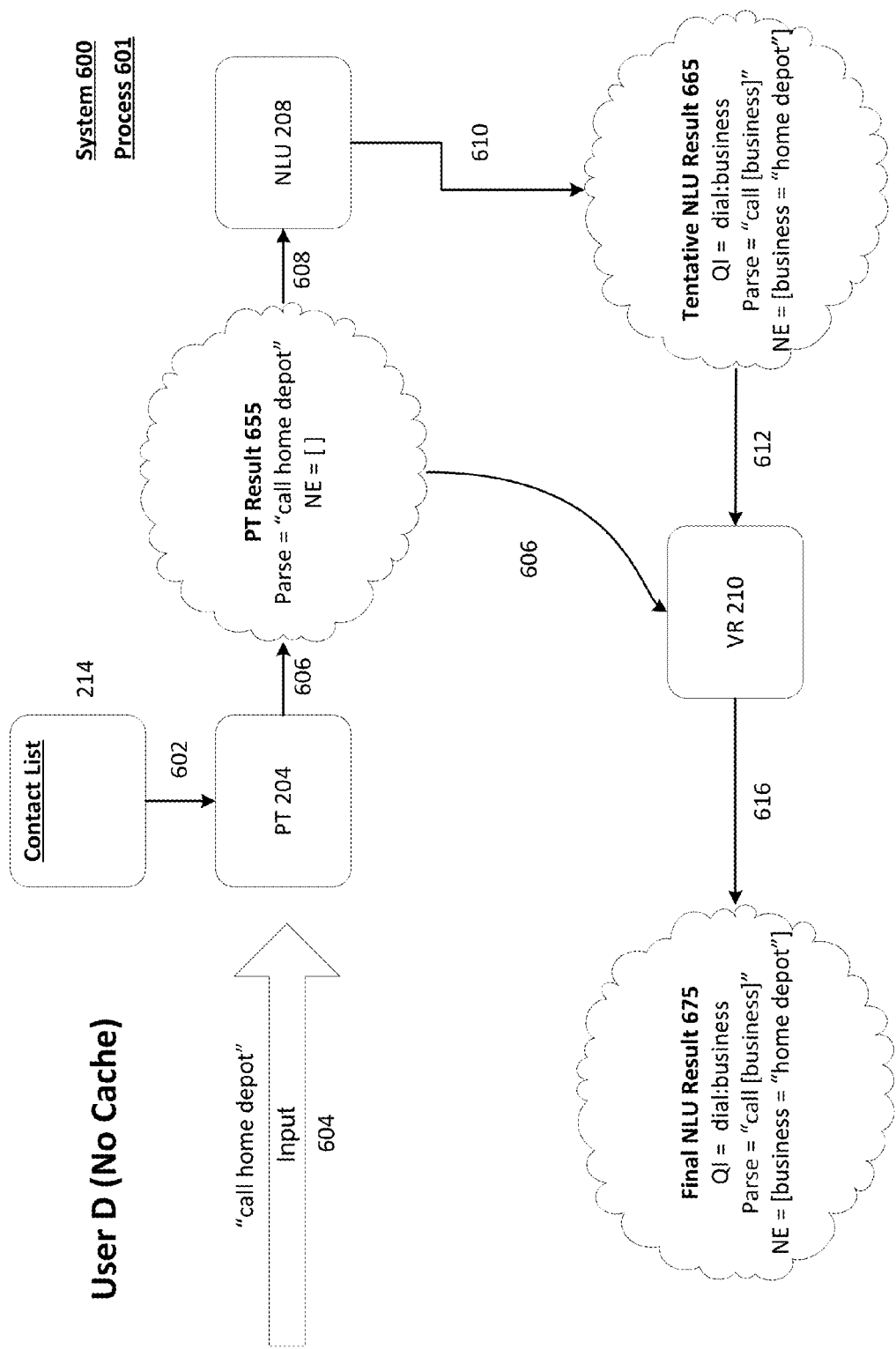
FIG. 6 depicts an illustrative diagram showing an example system and flow process of pre-tagging results without a cache in accordance with disclosed aspects.

FIG. 6 illustrates an example system 600 illustrating a process flow 601 in accordance with one or more features described herein. System 600 may be an automatic conversational system that may be similar to, be the same as, or include systems 200 and/or 300, or portions thereof. For example, system 600 may include an input device and ASR (not shown), a PT 204, a NLU 208, a VR 210, and a database 214 (which may include metadata). Process 601 may be implemented with one or more components of system 600. Process 601 may be implemented for a user D and/or a device associated with user D. Process 601 is very similar to process 401, with a difference being the user's contact list might not contain any contacts. Because the input/query (call home depot) is the same as in process 401 and user D's contact list might not contain "home depot," the steps of process 601 (steps 602, 604, 608, 610, 612, 614, and 616) may be substantially similar to and/or the same as the steps of process 401 (steps 402, 404, 408, 410, 412, 414, and 416). Also, the results 655, 665, and 675 may be substantially similar to and/or the same as results 455, 465, and 475. According to some aspects, PT 204 shown in FIG. 6 may be the same PT 204 as shown in FIG. 3. For example, user A and user D may operate the same device, but may be separately logged on to the device such that PT 204 retrieves information associated with a respective user from database 214 whenever that user is logged on. According to some aspects, PT 204 in FIG. 6 may be a separate PT 204 as shown in FIG. 3. For example, user A may operate a first device that may include a first PT 204, and user D may operate a second device that may include a second PT 204. Similarly, other components (e.g., NLU 208, VR 210, database, 214, etc.) of system 600 may be the same as or separate from one or more of the components of system 300.

FIGS. 7-10 illustrate examples systems and process flows in accordance with one or more features described herein. For example, the systems and processes illustrated in FIGS. 7-10 may be directed to performing one or disclosed aspects with a cache, such as cache 206. The processes illustrated in FIGS. 7-10 may be performed in sequential order, such that one process may occur after another process. In one or more embodiments, the processes illustrated in FIGS. 7-10 and/or one or more steps thereof may be performed by a computing device, such as devices 103, 105, 107, and/or 109. In other embodiments, the processes illustrated in FIGS. 7-10 and/or one or more steps thereof may be embodied in computer-executable instructions that are stored in a computer-readable medium, such as a non-transitory computer-readable memory. Any of the disclosed steps in FIGS. 7-10 (and/or associated descriptions herein) may be omitted, be performed in other than the recited order, repeated, and/or combined.

Figure 7:
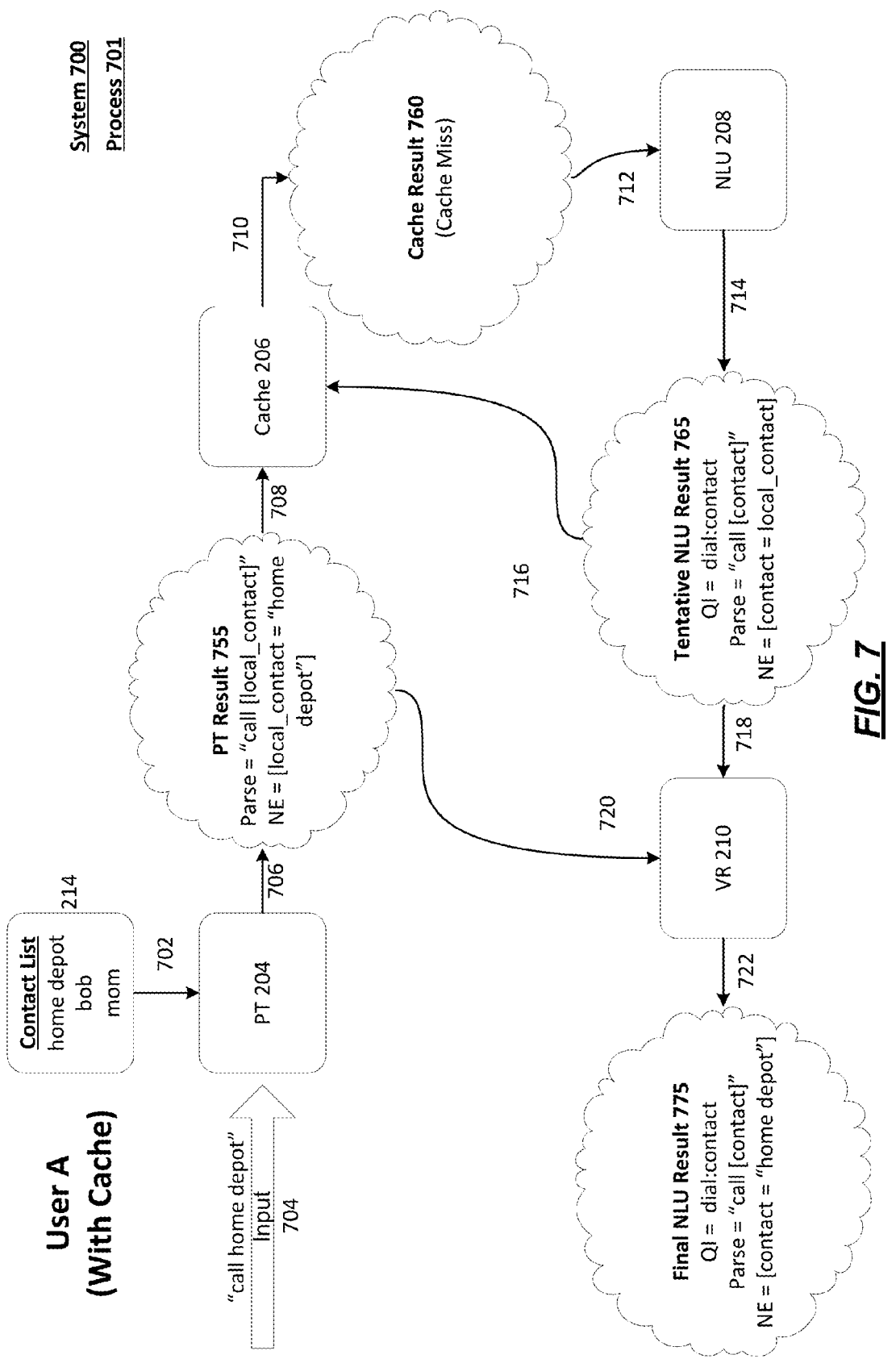
FIG. 7 depicts an illustrative diagram showing an example system and flow process of pre-tagging results with a cache in accordance with disclosed aspects.

FIG. 7 illustrates an example system 700 illustrating a process flow 701 in accordance with one or more features described herein. System 700 may be an automatic conversational system that may be similar to, be the same as, or include system 200 or portions thereof. For example, system 700 may include an input device and ASR (not shown), a PT 204, a cache 206, a NLU 208, a VR 210, and a database 214 (which may include metadata). Process 701 may be implemented with one or more components of system 700. Process 701 may be implemented for a user A and/or a device associated with user A.

Process 701 may begin with step 702, in which the PT 204 may retrieve and/or access information from the database 214. This information may include any metadata that was previously and/or is currently being stored/retrieved by database 214 from a user (e.g., user A) and/or device (e.g., a device associated with user A, such as devices 103, 105, 107, and/or 109). As shown in FIG. 7, this information may include a contacts list, which may include various types of information for each contact listed on the contact list, such as a name, telephone number, email address, physical address/location, handle name, and the like. According to some aspects, the database 214 may be part of a server or other computing system. According to some aspects, the database 214 may be stored at a site remote from the device (or user), such as in an enterprise server. According to some aspects, the database may be stored in a local memory of the device. In one example, the PT 204 may retrieve information, such as a contact's name and/or telephone number, from the database 214 using a user or device ID. For example, the information stored in the database 214 may be stored according to user and/or device, and PT 204 may retrieve information (e.g., metadata) associated with a user and/or device with the user ID or device ID. As shown in FIG. 7, user A's contact list may include the contacts of home depot, bob, and mom.

At step 704, PT 204 may retrieve an input or query that may be composed of one or more terms, words, numbers, and the like. This input may be transmitted by an ASR, such as ASR 202. For example, the query may be derived via speech recognition, in which a speech input may be rendered into text. According to some aspects, the input may be transmitted by an input device or other computing device. According to some aspects, the input may be a text based input. As shown in FIG. 7, the input in this example may comprise the query "call home depot."

At step 706, after receiving the input the PT 204 may analyze the query. For example, the PT 204 may determine one or more named entities in the query using internal concept mapping. These named entities may be formatted into hypernyms and/or hyponyms. For example, using the information/metadata from database 214, the PT 204 may implement a named entity recognition algorithm to determine that the query contains one or more terms (e.g., a named entity) that may correspond (e.g., match) to information in the database associated with user A (e.g., a contact on user A's contact list). In such a case, the user may have the telephone number for the user's wife who works at a local home depot programmed into his phone, and may just label the telephone number as "home depot" in his contacts list. In this example, PT 204 may determine that a named entity within the query is "home depot." PT 204 may also determine that this identified named entity (or some portion thereof) is in user A's contact list. PT 204 may then associate this identified named entity (home depot) with the source of the match (local contact). According to some aspects, the named entity may be a hyponym of the source, such that the source may identify a category for the named entity. PT 204 may then produce and/or store a value for the named entity in a result 755. For example, the result 755 may include the data result of NE=[local_contact="home depot"]. According to some aspects, PT 204 may search the database 214 for any metadata that may correspond and/or match all or a portion of an identified named entity (e.g., via a string matching algorithm). The PT 204 may also process the query by using a string matching and/or grammar-based approaches (e.g., grammars and/or inventories may be derived from the user's metadata). For example, PT 204 may determine a parse structure, which may determine the structure of the query in which the named entity is embedded. For example, for the input "call home depot," the PT 204 may determine that the named entity "home depot" is on user A's contact list, and may replace (e.g., annotate, as discussed above) the named entity in the query with an associated hyponym and/or category (e.g., local contact). Accordingly, the PT result 755 may also include the data result of Parse="call [local_contact]".

At step 708, PT 204 may transmit the PT result 755 to cache 206. At step 710, cache 206 may analyze the result 755 to determine if a portion or the entirety of the result 755 corresponds and/or matches to any entry or key located in the cache 206. A cache key may be an entry stored in a cache, which corresponds to an NLU result. According to some aspects, the NLU result may be a partial NLU result. For example, a full NLU result may be comprised of two parts, A and B. In this situation, the cache key may correspond to A and B, just A, or just B. A cache key may be of a similar form/format as of a PT result. A cache key will be described below in more detail. According to some aspects, at step 710, cache 206 may be empty or otherwise not contain a cache key that corresponds and/or matches to result 755 (e.g., a cache miss), and thus the cache result 760 produced by cache 206 at step 710 may be empty.

At step 712, the result 755 and/or original query (e.g., from step 704) may be transmitted to the NLU 208. At step 714, the NLU 208 may process the query of text words to determine a result 765. This result 765 may include a named entity item, a parse item, and a query intent item. For example, the NLU 208 may determine a named entity for the query "call [local_contact]," which is the Parse item in result 755. NLU 208 may determine that the named entity is "local_contact" and may then determine a category and/or hypernym for this named entity. In this case, "local_contact" may be a hyponym of the hypernym "contact." According to some aspects, the hypernym contact may have one or more other hyponyms, such as remote_contact (e.g., a contact that might not be stored on user A's telephone). Accordingly, the result 765 may include the data result of NE= [contact=local_contact]. The NLU 208 may determine a parse structure, which may determine the structure of the query in which the named entity is embedded. For example, for the input "call [local_contact]," the NLU 208 may determine that the named entity "[local_contact]" is in the category of contact, and may replace (e.g., annotate, as discussed above) the named entity in the query with an associated hyponym and/or category (e.g., contact). Accordingly, the result 765 may also include the data result of Parse="call [contact]. NLU 208 may also determine a query intent. For example, the natural language processing of the word "call" might correspond to the intention of dial, and because NLU 208 has identified the named entity as "contact," the result 765 may include the query intent of "dial: contact". According to some aspects, determining the query intent may consume a great deal of processing resources (e.g., be computationally expensive).

At step 716, NLU 208 may then transmit result 765 to cache 206. Cache 206 may then store result 765 as a value that corresponds to a specific key. That specific key may be the PT result 755. An example of this may be illustrated in FIG. 11, which shows an example key/value table 1100, which may describe the contents of cache 206 after step 716. As shown in FIG. 11, table 1100 may contain a key column 1102, which stores one or more keys, and a value column 1104, which stores one or more values. Each key may correspond to a value, and each value may correspond to a key. For example, as shown in FIG. 11, the first entry includes a key comprising result 755 and a value comprising result 765. Thus, for this entry, result 755 corresponds to 765. Accordingly, whenever a PT result matches and/or corresponds to an entry's key 1102, the corresponding value 1104 may be retrieved and/or used in accordance with disclosed aspects instead of, in the place of, or in addition to a tentative NLU result. According to some aspects, a key may correspond to a plurality of values, and/or a value may correspond to one or more keys. This will be described below in more detail.

At step 718, the NLU 208 may transmit the result 765 to the VR 210, and at step 720, the PT 204 may transmit the result 755 to VR 210. At step 722, VR 210 may then resolve the information contained in each result to produce a final NLU result 775, which may include a query intent, a named entity, and a parse. As shown in FIG. 7, the PT result 755 may include: Parse="call [local_contact]", Named Entity (NE)=[local_contact="home depot"]. The NLU result 765 may include: QI=dial:contact, Parse="call [contact]", NE= [contact=local_contact]. In such an example, the VR 210 may resolve contact=local_contact with local_contact="home depot." Thus, VR 210 may produce a final NLU result 775 of QI=dial:contact, Parse="call [contact]", NE=[contact="home depot"].

Figure 8:
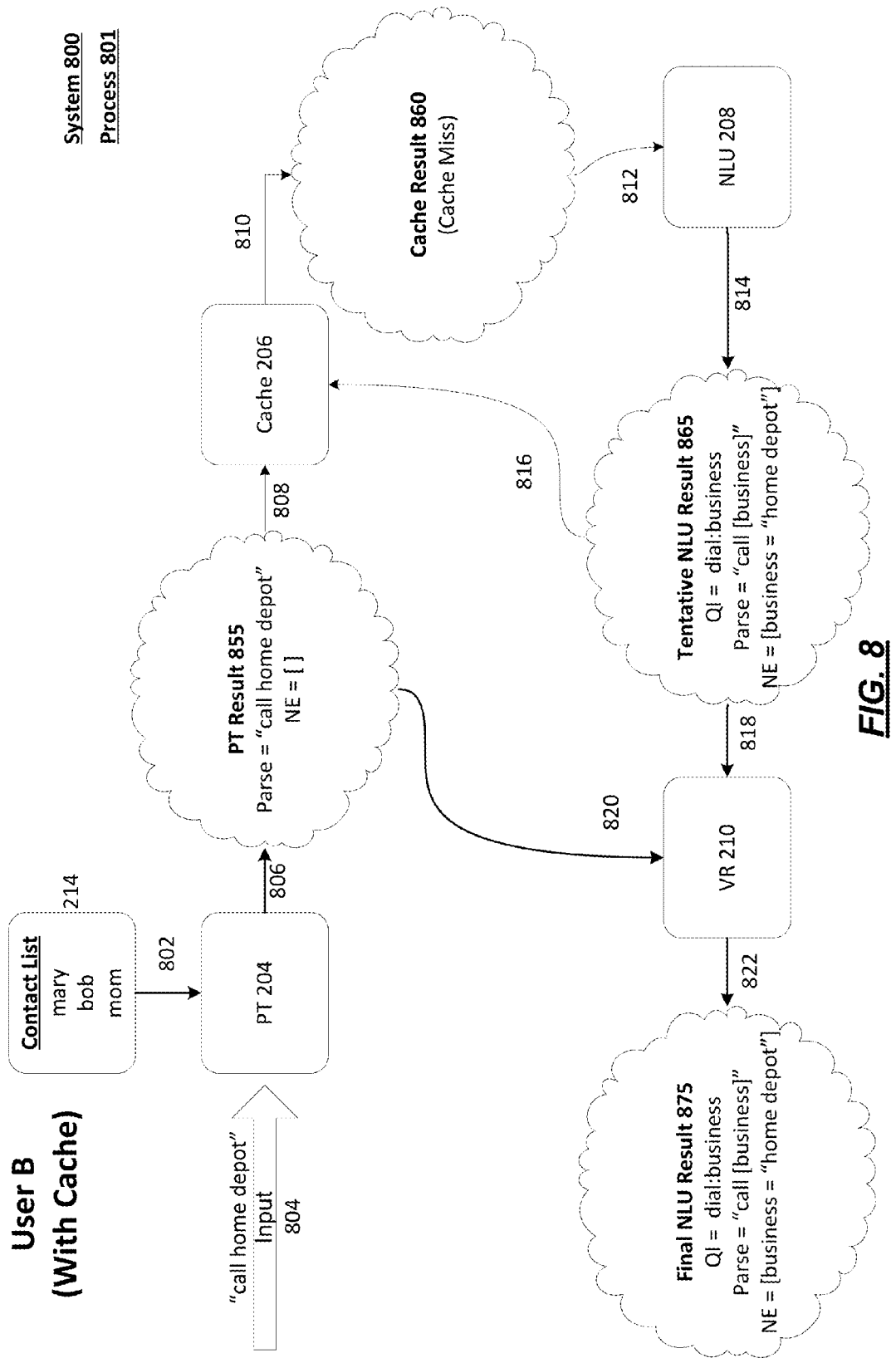
FIG. 8 depicts an illustrative diagram showing an example system and flow process of pre-tagging results with a cache in accordance with disclosed aspects.

FIG. 8 illustrates an example system 800 illustrating a process flow 801 in accordance with one or more features described herein. System 800 may be an automatic conversational system that may be similar to, be the same as, or include systems 200 and/or 700, or portions thereof. For example, system 800 may include an input device and ASR (not shown), a PT 204, a cache 206, a NLU 208, a VR 210, and a database 214 (which may include metadata). Process 801 may be implemented with one or more components of system 800. Process 801 may be implemented for a user B and/or a device associated with user B. With regard to FIG. 8, the process 701 may occur before the process 801 shown in FIG. 8. Therefore, the state of the NLU cache 206 with respect to process 801 shown in FIG. 8 may be as described and shown in FIG. 11. One of ordinary skill in the art would appreciate that the process 801 might not occur immediately after the process 701. For example, process 801 may occur after one or more queries (e.g., 5, 100, 50000, etc. queries).

Process 801 may begin with step 802, in which the PT 204 may retrieve and/or access information from the database 214. This information may include any metadata that was previously and/or is currently being stored/retrieved by database 214 from a user (e.g., user B) and/or device (e.g., a device associated with user B, such as devices 103, 105, 107, and/or 109). As shown in FIG. 8, this information may include a contacts list, which may include various types of information for each contact listed on the contact list, such as a name, telephone number, email address, physical address/location, handle name, and the like. In one example, the PT 204 may retrieve information, such as a contact's name and/or telephone number, from the database 214 using a user or device ID. For example, the information stored in the database 214 may be stored according to user and/or device, and PT 204 may retrieve information (e.g., metadata) associated with a user and/or device with the user ID or device ID. As shown in FIG. 8, user B's contact list may include the contacts of mart', bob, and mom. According to some aspects, PT 204 in FIG. 8 may be a separate PT 204 as shown in FIG. 7. For example, user A may operate a first device that may include a first PT 204, and user B may operate a second device that may include a second PT 204. Similarly, other components (e.g., cache, 206, NLU 208, VR 210, database, 214, etc.) of system 800 may be the same as or separate from one or more of the components of system 700.

At step 804, PT 204 may retrieve an input or query that may be composed of one or more terms, words, numbers, and the like. This input may be transmitted by an ASR, such as ASR 202. According to some aspects, the input may be a text based input. As shown in FIG. 8, the input in this example may comprise the query "call home depot."

At step 806, after receiving the input the PT 204 may analyze the query. For example, the PT 204 may determine one or more named entities in the query using internal concept mapping. These named entities may be formatted into hypernyms and/or hyponyms. For example, using the information/metadata from database 214, the PT 204 may implement a named entity recognition algorithm to determine that the query contains one or more terms (e.g., a named entity) that may not correspond (e.g., no match) to information in the database associated with user B. In this example, PT 204 may determine that "home depot" might not correspond to a contact in user B's contact list. Because there is no named entity match to user B's contact list, the NE item in result 855 is blank (NE=[ ]). The result 855 may also include the data result of Parse="call home depot," because there might not be any annotation performed due to there being no match in user B's contact list.

At step 808, PT 204 may transmit the PT result 855 to cache 206, which may be the same cache 206 in system 700. At step 810, cache 206 may analyze the result 855 to determine if any of the result 855 corresponds and/or matches to any entry or key located in the cache 206. According to some aspects, at step 810, cache 206 may contain an entry that may include a key comprising result 755 and a corresponding value comprising result 765 (as shown in FIG. 11). In this example, cache 206 may determine that PT result 855 might not match or correspond to the key of the first entry (or any other entry) of table 1100 (e.g., a cache miss), and thus the cache result 860 produced by cache 206 at step 810 may be empty.

At step 812, the result 855 and/or original query (e.g., from step 804) may be transmitted to the NLU 208. At step 814, the NLU 208 may process the query of text words to determine a result 865. This result 865 may include a named entity item, a parse item, and a query intent item. For example, the NLU 208 may determine a named entity for the query "call home depot," which is the Parse item in result 855. NLU 208 may determine that the named entity is "home depot" and may then determine a category and/or hypernym for this named entity. In this case, "home depot" may be a hyponym of the hypernym "business." Accordingly, the result 865 may include the data result of NE= [business="home depot"]. The NLU 208 may determine a parse structure, which may determine the structure of the query in which the named entity is embedded. For example, for the input "call home depot," the NLU 208 may determine that the named entity "home depot" is in the category of business, and may replace (e.g., annotate, as discussed above) the named entity in the query with an associated hyponym and/or category (e.g., business). Accordingly, the result 865 may also include the data result of Parse="call [business]." NLU 208 may also determine a query intent. For example, the natural language processing of the word "call" might correspond to the intention of dial, and because NLU 208 has identified the named entity as "business," the result 865 may include the query intent of "dial:business". According to some aspects, determining the query intent may consume a great deal of processing resources (e.g., be computationally expensive).

At step 816, NLU 208 may then transmit result 865 to cache 206. Cache 206 may then store result 865 as a value that corresponds to a specific key. That specific key may be the PT result 855. An example of this may be illustrated in FIG. 12, which shows key/value table 1100, which may describe the contents of cache 206 after step 816. As shown in FIG. 12, the first entry of table 1100 includes a key comprising result 755 and a value comprising result 765, and the second entry of table 1100 includes a key comprising result 855 and a value comprising result 865. Thus, for the second entry, result 855 corresponds to 865. Accordingly, whenever a PT result matches and/or corresponds to an entry's key 1102, the corresponding value 1104 may be retrieved and/or used in accordance with disclosed aspects instead of, in the place of, or in addition to a tentative NLU result. This will be described below in more detail.

At step 818, the NLU 208 may transmit the result 865 to the VR 210, and at step 820, the PT 204 may transmit the result 855 to VR 210. At step 822, VR 210 may then resolve the information contained in each result to produce a final NLU result 875, which may include a query intent, a named entity, and a parse. As shown in FIG. 8, because there was no NE item in result 855, the final NLU result 875 may be the same as result 865.

Figure 9:
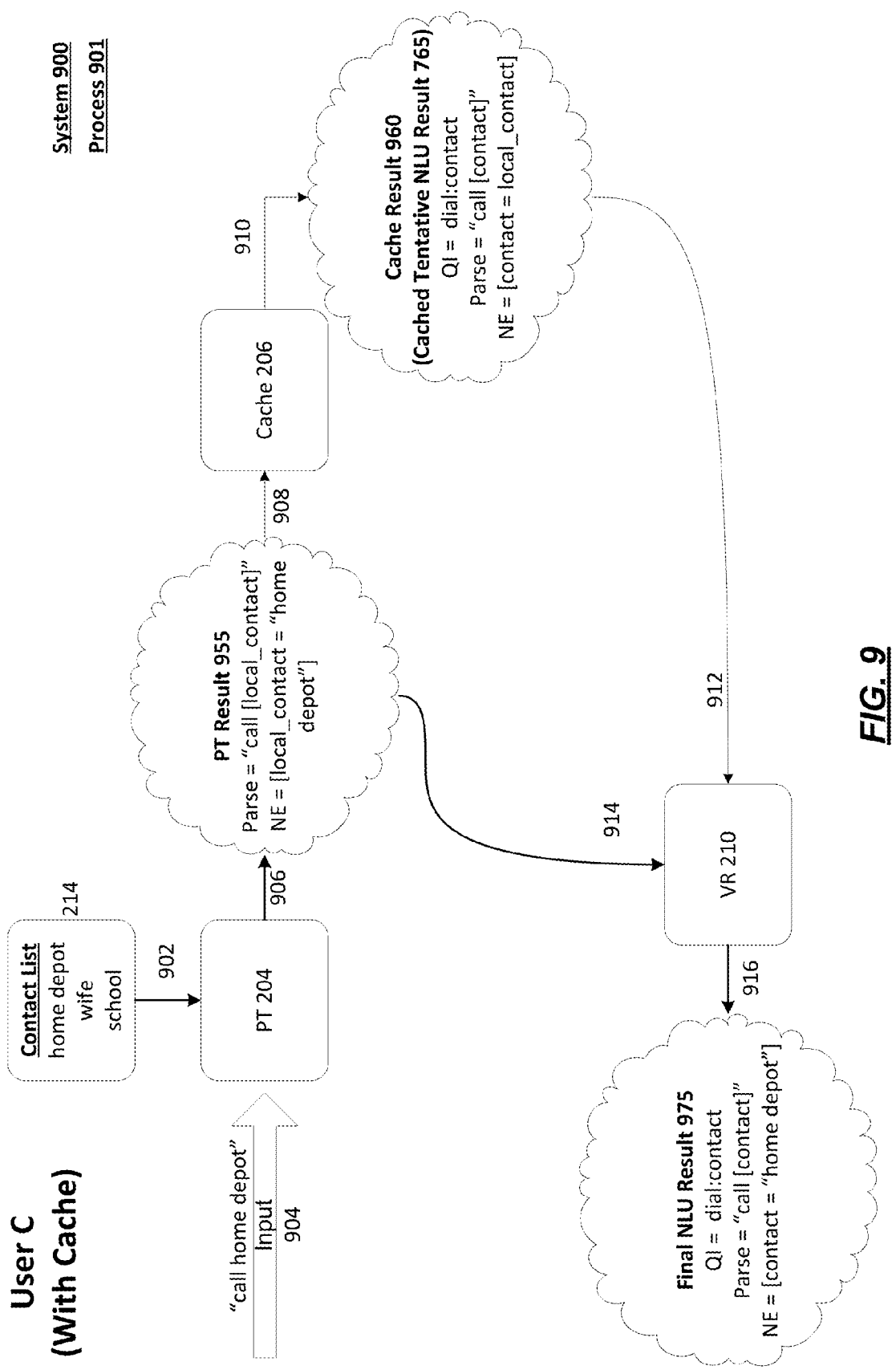
FIG. 9 depicts an illustrative diagram showing an example system and flow process of pre-tagging results with a cache in accordance with disclosed aspects.

FIG. 9 illustrates an example system 900 illustrating a process flow 901 in accordance with one or more features described herein. System 900 may be an automatic conversational system that may be similar to, be the same as, or include systems 200 and/or 700 or portions thereof. For example, system 900 may include an input device and ASR (not shown), a PT 204, a cache 206, a NLU 208, a VR 210, and a database 214 (which may include metadata). Process 901 may be implemented with one or more components of system 900. Process 901 may be implemented for a user C and/or a device associated with user C. With regard to FIG. 9, the processes 701 or 801 shown in FIG. 7 and FIG. 8 may occur before the process 901 shown in FIG. 9. Therefore, the state of the NLU cache 206 with respect to process 901 shown in FIG. 9 may be as described and shown in either FIG. 11 or FIG. 12. One of ordinary skill in the art would appreciate that the process 901 might not occur immediately after the process 701 or process 801. For example, process 901 may occur after one or more queries (e.g., 5, 100, 50000, etc. queries).

Process 901 may begin with step 902, in which the PT 204 may retrieve and/or access information from the database 214. This information may include any metadata that was previously and/or is currently being stored/retrieved by database 214 from a user (e.g., user C) and/or device (e.g., a device associated with user C, such as devices 103, 105, 107, and/or 109). As shown in FIG. 9, this information may include a contacts list, which may include various types of information for each contact listed on the contact list, such as a name, telephone number, email address, physical address/location, handle name, and the like. For example, the information stored in the database 214 may be stored according to user and/or device, and PT 204 may retrieve information (e.g., metadata) associated with a user and/or device with the user ID or device ID. As shown in FIG. 9, user C's contact list may include the contacts of home depot, wife, and school. According to some aspects, PT 204 may be a locally stored component of a user device, and thus the PT 204 in FIG. 9 may be a separate PT 204 as shown in FIG. 7. For example, user A may operate a first device that may include or be associated with a first PT 204, and user C may operate a second device that may include or be associated with a second PT 204. Similarly, other components (e.g., cache, 206, NLU 208, VR 210, database, 214, etc.) of system 900 may be the same as or separate from one or more of the components of system 700. According to some aspects, the PT 204 may be a global component that may be accessed and/or used by one or more user devices.

At step 904, PT 204 may retrieve an input or query that may be composed of one or more terms, words, numbers, and the like. This input may be transmitted by an ASR, such as ASR 202. For example, the query may be derived via speech recognition, in which a speech input may be rendered into text. According to some aspects, the input may be transmitted by an input device or other computing device. According to some aspects, the input may be a text based input. As shown in FIG. 9, the input in this example may comprise the query "call home depot."

At step 906, after receiving the input the PT 204 may analyze the query. For example, the PT 204 may determine one or more named entities in the query using internal concept mapping. These named entities may be formatted into hypernyms and/or hyponyms. For example, using the information/metadata from database 214, the PT 204 may implement a named entity recognition algorithm to determine that the query contains one or more terms (e.g., a named entity) that may correspond (e.g., match) to information in the database associated with user C (e.g., a contact on user C's contact list). In this example, PT 204 may determine that a named entity within the query is "home depot." PT 204 may also determine that this identified named entity (or some portion thereof) is in user C's contact list. PT 204 may then associate this identified named entity (home depot) with the source of the match (local contact). According to some aspects, the named entity may be a hyponym of the source, such that the source may identify a category for the named entity. PT 204 may then produce and/or store a value for the named entity in a result 955. For example, the result 955 may include the data result of NE=[local_contact="home depot"]. According to some aspects, PT 204 may search the database 214 for any metadata that may correspond and/or match all or a portion of an identified named entity (e.g., via a string matching algorithm). The PT 204 may also process the query by using a string matching and/or grammar-based approaches (e.g., grammars and/or inventories may be derived from the user's metadata). For example, PT 204 may determine a parse structure, which may determine the structure of the query in which the named entity is embedded. For example, for the input "call home depot," the PT 204 may determine that the named entity "home depot" is on user C's contact list, and may replace (e.g., annotate, as discussed above) the named entity in the query with an associated hyponym and/or category (e.g., local contact). Accordingly, the PT result 955 may also include the data result of Parse="call [local_contact]".

At step 908, PT 204 may transmit the PT result 955 to cache 206, which may be the same cache as shown in FIGS. 7 and 8. At step 910, cache 206 may analyze the result 955 to determine if any of the result 955 corresponds and/or matches to any entry or key located in the cache 206. FIG. 13 illustrates table 1100 which shows the contents of cache 206 at this point in process 901. As shown in FIG. 13, the first entry of table 1100 may include a key 1102 that matches or otherwise corresponds with the PT result 955 (e.g., the Parse values match and the NE values match). The first entry's key 1102 may have been previously generated/created/stored in response to the cache receiving a PT result not currently stored in the cache (e.g., see step 708 in FIG. 7). Because of this correspondence between PT result 955 and the first entry's key 1102, cache 206 may retrieve the key's corresponding value 1104. In this example, the corresponding value 1104 may have been previously generated/created in response to the cache receiving a tentative NLU result previously generated (e.g., see step 716) during a process in which the value's corresponding key was created (e.g., process 701). Thus, in this example, the corresponding value may be the tentative result 765 previously generated by NLU 208 and stored by cache 206 in process 701 (see FIG. 7). Thus, by using a cached tentative NLU result, system 900 may be able to save computational resources that may be associated with NLU 208 generating a tentative NLU result (as shown above).

At step 912, cache 206 may then transmit the cache result 960 to the VR 210, and at step 914, the PT 204 may transmit the result 955 to VR 210. At step 916, VR 210 may then resolve the information contained in each result to produce a final NLU result 975, which may include a query intent, a named entity, and a parse. As shown in FIG. 9, the PT result 955 may include: Parse="call [local_contact]", Named Entity (NE)=[local_contact="home depot"]. The cache result 960 may include: QI=dial:contact, Parse="call [contact]", NE=[contact=local_contact]. In such an example, the VR 210 may resolve contact=local_contact with local_contact="home depot." Thus, VR 210 may produce a final NLU result 975 of QI=dial:contact, Parse="call [contact]", NE=[contact="home depot"].

According to some aspects, a key may correspond to a plurality of values. For example, an entity associated with system 900 (e.g., an enterprise, a business, a server, etc.) may determine that a user may prefer to be presented with a direct call to a contact list entry during the user's normal work hours, and that the user may prefer to be presented with a call to a local business during the user's normal off-work hours. Therefore, a particular key may retrieve a first result (e.g., the number of the stored contact home depot) during the user's normal work hours, and the same key may retrieve a second result (e.g., a local home depot's main number) during the user's normal off-work hours. According to some aspects, this determination may be when the key is input into the cache 206. According to some aspects, this determination may be made as a processing step into the VR 210. For example, the plurality of NLU results may be pushed into the cache 206, and the determination based on the user's work hours may be performed in the VR 210. According to some aspects, a value may correspond to a plurality of keys. For example, the entity associated with system 900 may determine that the values that include Parse="call [local_contact]", Parse="phone [local_contact]", or Parse="ring [local_contact]" may all have the same or similar meaning (e.g., correspond to the same key). Therefore, these values may be associated with a same (or similar) key in the cache.

Figure 10:
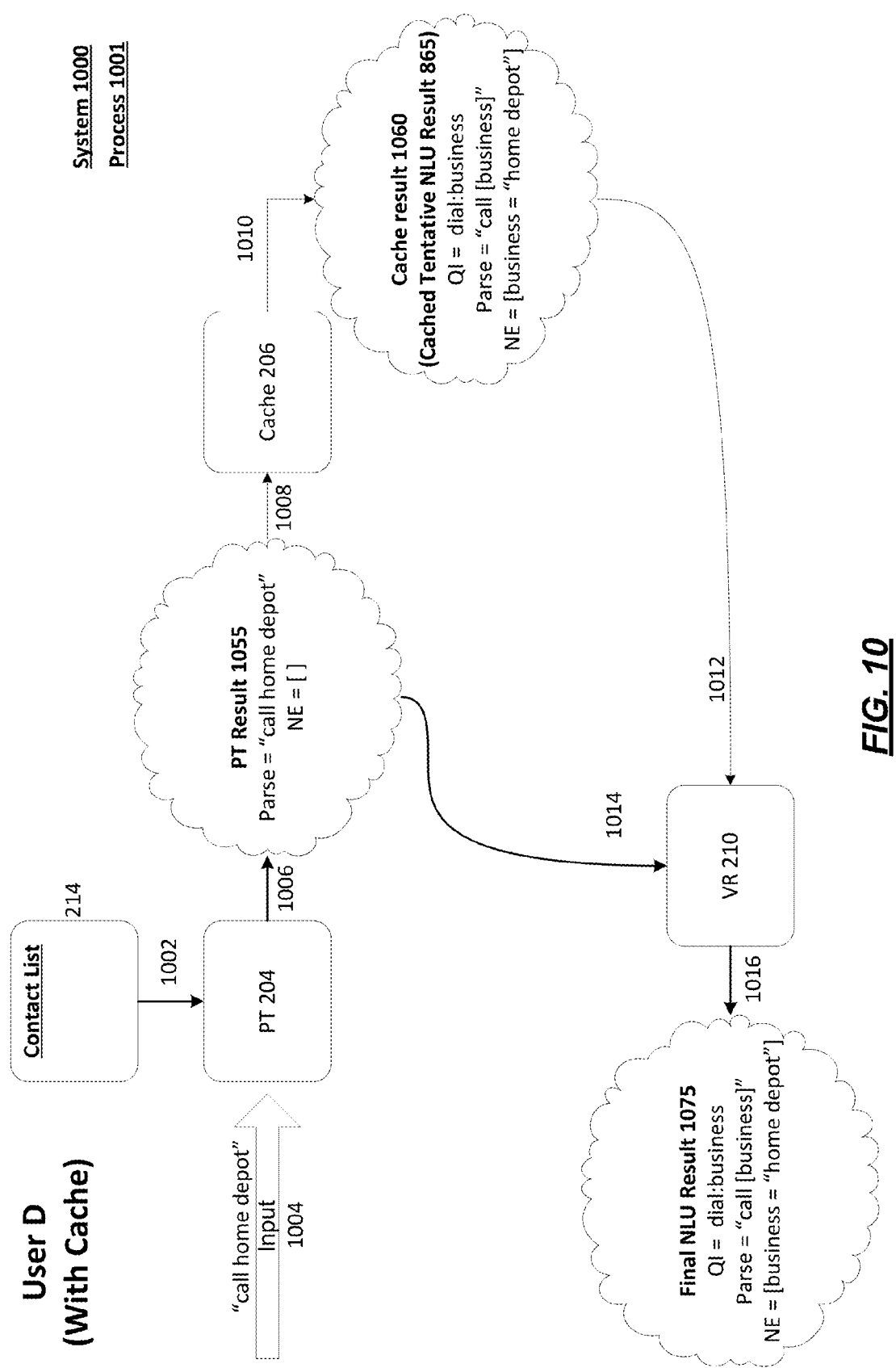
FIG. 10 depicts an illustrative diagram showing an example system and flow process of pre-tagging results with a cache in accordance with disclosed aspects.

FIG. 10 illustrates an example system 1000 illustrating a process flow 1001 in accordance with one or more features described herein. System 1000 may be an automatic conversational system that may be similar to, be the same as, or include systems 200 and/or 700, or portions thereof. For example, system 1000 may include an input device and ASR (not shown), a PT 204, a cache 206, a NLU 208, a VR 210, and a database 214 (which may include metadata). Process 1001 may be implemented with one or more components of system 1000. Process 1001 may be implemented for a user D and/or a device associated with user D. With regard to FIG. 10, the processes 701, 801, and/or 901 may occur before the process 1001 shown in FIG. 10. Therefore, the state of the NLU cache 206 with respect to process 1001 shown in FIG. 10 may be as described and shown in FIG. 11, FIG. 12, or FIG. 13. One of ordinary skill in the art would appreciate that the process 1001 might not occur immediately after the process 701, process 801, or process 901. For example, process 1001 may occur after one or more queries (e.g., 5, 100, 50000, etc. queries).

Process 1001 may begin with step 1002, in which the PT 204 may retrieve and/or access information from the database 214. This information may include any metadata that was previously and/or is currently being stored/retrieved by database 214 from a user (e.g., user D) and/or device (e.g., a device associated with user D, such as devices 103, 105, 107, and/or 109). As shown in FIG. 10, this information may include a contacts list, which may include various types of information for each contact listed on the contact list, such as a name, telephone number, email address, physical address/location, handle name, and the like. In one example, the PT 204 may retrieve information, such as a contact's name and/or telephone number, from the database 214 using a user or device ID. For example, the information stored in the database 214 may be stored according to user and/or device, and PT 204 may retrieve information (e.g., metadata) associated with a user and/or device with the user ID or device ID. As shown in FIG. 10, user D's contact list might not contain any contacts. According to some aspects, PT 204 in FIG. 10 may be a separate PT 204 as shown in FIG. 7. For example, user A may operate a first device that may include a first PT 204, and user D may operate a second device that may include a second PT 204. Similarly, other components (e.g., cache, 206, NLU 208, VR 210, database, 214, etc.) of system 1000 may be the same as or separate from one or more of the components of system 700.

At step 1004, PT 204 may retrieve an input or query that may be composed of one or more terms, words, numbers, and the like. This input may be transmitted by an ASR, such as ASR 202. According to some aspects, the input may be a text based input. As shown in FIG. 10, the input in this example may comprise the query "call home depot."

At step 1006, after receiving the input the PT 204 may analyze the query. For example, the PT 204 may determine one or more named entities in the query using internal concept mapping. These named entities may be formatted into hypernyms and/or hyponyms. For example, using the information/metadata from database 214, the PT 204 may implement a named entity recognition algorithm to determine that the query contains one or more terms (e.g., a named entity) that may not correspond (e.g., no match) to information in the database associated with user D. In this example, PT 204 may determine that "home depot" might not correspond to a contact in user D's contact list. Because there is no named entity match to user D's contact list, the NE item in result 1055 is blank (NE=[ ]). The result 1055 may also include the data result of Parse="call home depot," because there might not be any annotation performed due to there being no match in user D's contact list.

At step 1008, PT 204 may transmit the PT result 1055 to cache 206, which may be the same cache 206 in system 700. At step 1010, cache 206 may analyze the result 1055 to determine if any of the result 1055 corresponds and/or matches to any entry or key located in the cache 206. FIG. 14 illustrates table 1100 which shows the contents of cache 206 at this point in process 1001. As shown in FIG. 14, the second entry of table 1100 may include a key 1102 that matches or otherwise corresponds with the PT result 1055 (e.g., the Parse values match and the NE values match). The second entry's key 1102 may have been previously generated/created/stored in response to the cache receiving a PT result not currently stored in the cache (e.g., see step 808 in FIG. 8). Because of this correspondence between PT result 1055 and the second entry's key 1102, cache 206 may retrieve the key's corresponding value 1104. In this example, the corresponding value 1104 may have been previously generated/created in response to the cache receiving a tentative NLU result previously generated (e.g., see step 816) during a process in which the value's corresponding key was crated (e.g., process 801). Thus, in this example, the corresponding value may be the tentative result 865 previously generated by NLU 208 and stored by cache 206 in process 801 (see FIG. 8). Thus, by using a cached tentative NLU result, system 1000 may be able to save computational resources that may be associated with NLU 208 generating a tentative NLU result (as shown above).

At step 1012, cache 206 may then transmit the cache result 1060 to the VR 210, and at step 1014, the PT 204 may transmit the result 1055 to VR 210. At step 1016, VR 210 may then resolve the information contained in each result to produce a final NLU result 975, which may include a query intent, a named entity, and a parse. As shown in FIG. 10, because there was no NE item in result 1055, the final NLU result 1075 may be the same as the cache result 1060. According to some aspects, the cache result (e.g., cache result 1060) may be returned as the final NLU result 1075, and thus bypassing VR 210.

While the above examples are directed to the PT 204 deriving information/metadata associated with a user's contact list to generate the cache key 1102, any other information and/or metadata may be used in accordance with disclosed features. For example, the metadata associated with a user may be a user's geolocation. In this example, user E in Wichita Falls may input "go to home depot" into a device while being within 5 km of an actual Home Depot located in Wichita Falls. The PT 204 may process this query to determine that home depot is a business (e.g., via named entity recognition as described above), and may cross reference the user's geolocation to a Home Depot within 5 km. Thus, the PT result may comprise Parse="go to [business, distance<5 km]" and NE=[business,distance<5 km="home depot"]. Further in this example, the user's cache 206 may not contain a key corresponding to this PT result, and thus may result in a cache miss. The NLU 208 may then process the query (go to home depot) and/or the PT result, and may return an NLU result. This NLU result may then be stored in the cache 206 as a value with a correspond key comprising the PT result of Parse="go to [business,distance<5 km]" and NE=[business,distance<5 km="home depot"]. Continuing with this example, a few days after user E has performed the steps listed above, user F in San Francisco may input "go to home depot" into a device while being within 5 km of a Home Depot located in San Francisco (e.g., not within 5 km of the Home Depot in Wichita Falls). The PT 204 may analyze this query and may produce the same PT result as was produced in the user E scenario, and thus user F's PT result may comprise Parse="go to [business,distance<5 km]" and NE=[business,distance<5 km="home depot"]. Using the same cache 206 (e.g., may be located at a remote location) as in user E's scenario, but now the cache 206 includes a key corresponding to user F's PT result (e.g., a cache hit), the NLU 208 might not need to process the query and/or the PT result. Instead, the value corresponding to the PT result may be retrieved and used, thus saving computational resources. The device may then, for example, retrieve a map application and produce a travel itinerary or directions to the Home Depot. Further, a user G in Los Angeles may input "go to home depot" into a device while not being within 5 km of a Home Depot located in Los Angeles (e.g., not within 5 km of the Home Depots in Wichita Falls or San Francisco). In such a case, the NLU Result may be to start a web browser on user G's device and retrieve the Home Depot website.

One or more embodiments may be implemented in any conventional computer programming language. For example, embodiments may be implemented in a procedural programming language (e.g., "C") or an object-oriented programming language (e.g., "C++", Python). Some embodiments may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Such computer instructions may be written in a number of programming languages for use with one or more computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments may be implemented as a combination of both software (e.g., a computer program product) and hardware. Still other embodiments may be implemented as entirely hardware, or entirely software (e.g., a computer program product).

A described "process" is the performance of a described function in a computer using computer hardware (such as a processor, domain-programmable gate array, or other electronic combinatorial logic, or similar device), which may be operating under control of software or firmware or a combination of any of these or operating outside control of any of the foregoing. All or part of the described function may be performed by active or passive electronic components, such as transistors or resistors. Use of the term "process" might not necessarily imply a schedulable entity, although, in some embodiments, a process may be implemented by such a schedulable entity. Furthermore, unless the context otherwise requires, a "process" may be implemented using more than one processor or more than one (single- or multi-processor) computer and it may be an instance of a computer program or an instance of a subset of the instructions of a computer program.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing devices and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method for performing natural language understanding (NLU) via computer processing, the method comprising:
    determining, by a computing device, a preceding pretag result and a tentative NLU result, for each of one or more preceding natural language inputs;
    storing, in a cache, one or more keys, each key comprising one preceding pretag result and a corresponding tentative NLU result;
    receiving, by the computing device, a first natural language input comprising a set of one or more terms;
    parsing, by the computing device, the first natural language input to determine a first pretag result comprising at least a first string comprising at least one term from the set of one or more terms, wherein the parsing comprises determining whether any of the one or more terms match metadata associated with a contacts list;
    determining, by the computing device, whether the first pretag result corresponds to at least one key stored in the cache;
    if the first pretag result corresponds to at least one key stored in the cache, retrieving, by the computing device and from the cache, one or more cached NLU results corresponding to the at least one key; and
    if the first pretag result does not correspond to at least one key stored in the cache:
        determining, by the computing device and based on the set of one or more terms, a first NLU result corresponding to the first natural language input, the first NLU result comprising an intent associated with the first natural language input;
        storing, by the computing device and in the cache, the first NLU result; and
        storing, by the computing device and in the cache, a first key comprising the first pretag result, the first key corresponding to the first NLU result.

2. The method of claim 1, wherein the first pretag result corresponds to at least one key stored in the cache, the method further comprising determining, by the computing device and for the first natural language input, a final NLU result based on the first pretag result and the one or more cached NLU results.

3. The method of claim 1, wherein the first pretag result does not correspond to at least one key stored in the cache, and wherein the cache stores the first NLU result and the first key comprising the first pretag result, the method further comprising:
    receiving, by the computing device, a second natural language input comprising one or more terms;
    parsing, by the computing device, the second natural language input to determine a second pretag result;
    determining, by the computing device, that the second pretag result corresponds to the first key stored in the cache; and
    retrieving, by the computing device and from the cache the first NLU result.

4. The method of claim 1, wherein parsing the first natural language input to determine the first pretag result comprises determining, by the computing device, a named entity based on the one or more terms comprised in the first natural language input, the named entity comprising at least one of the one or more terms comprised in the first natural language input.

5. The method of claim 4, wherein the first string comprising at least one term of the set of one or more terms further comprises the metadata.

6. The method of claim 1, wherein the at least one key comprises one or more of the following:
    a named entity identified from the one or more terms comprised in the first natural language input; and
    a string of words comprising at least one of the one or more terms comprised in the first natural language input.

7. The method of claim 1, wherein the determining the preceding pretag result for the one or more preceding natural language inputs comprises determining, based on device or user metadata, at least one string of one or more terms and wherein the determining the tentative NLU result for the one or more preceding natural language inputs comprises determining an intent associated with the one or more preceding natural language inputs, a string of terms, or a named entity.

8. The method of claim 1, wherein parsing the first natural language input to determine the first pretag result further comprises parsing, by the computing device, the first natural language input based on additional metadata to determine the first pretag result, and wherein the additional metadata comprises metadata associated with at least one of: a list of favorite websites, a favorite telephone number list, a favorite mobile applications list, a favorite restaurants list, a favorite business list, or a favorite location list.

9. A system, comprising:
  at least one processor; and
  at least one memory storing instructions that, when executed by the at least one processor, cause the system to perform:
  determining, by a device, a preceding pretag result and a tentative NLU result, for each of one or more preceding natural language inputs;
  storing, in a cache, one or more keys, each key comprising one preceding pretag result and a corresponding tentative NLU result;
  receiving, by the device, a first natural language input comprising a set of one or more terms;
  parsing the first natural language input to determine a first pretag result comprising at least a first string comprising at least one term from the set of one or more terms, wherein the parsing comprises determining whether any of the one or more terms match metadata associated with a contacts list;
  determining whether the first pretag result corresponds to at least one key stored in the cache;
  if the first pretag result corresponds to at least one key stored in the cache, retrieving, from the cache, one or more cached NLU results corresponding to the at least one key; and
  if the first pretag result does not correspond to at least one key stored in the cache:
    determining, based on the set of one or more terms, a first NLU result corresponding to the first natural language input, the first NLU result comprising an intent associated with the first natural language input;
    storing, in the cache, the first NLU result; and
    storing, in the cache, a first key comprising the first pretag result, the first key corresponding to the first NLU result.

10. The system of claim 9, wherein the first pretag result corresponds to at least one key stored in the cache, the instructions further cause the system to perform determining, for the first natural language input, a final NLU result based on the first pretag result and the one or more cached NLU results.

11. The system of claim 9, wherein the first pretag result does not correspond to at least one key stored in the cache, and wherein the cache stores the first NLU result and the first key comprising the first pretag result, the instructions further cause the system to perform:
  receiving a second natural language input comprising one or more terms;
  parsing the second natural language input to determine a second pretag result;
  determining that the second pretag result corresponds to the first key stored in the cache; and
  retrieving from the cache the first NLU result.

12. The system of claim 9, wherein parsing the first natural language input to determine the first pretag result comprises determining a named entity based on the one or more terms comprised in the first natural language input, the named entity comprising at least one of the one or more terms comprised in the first natural language input.

13. The system of claim 9, wherein the at least one key comprises one or more of the following:
  a named entity identified from the one or more terms comprised in the first natural language input; and
  a string of words comprising at least one of the one or more terms comprised in the first natural language input.

14. The system of claim 9, wherein the instructions further cause the system to perform:
  determining the preceding pretag result for the one or more preceding natural language inputs by determining, based on device or user associated metadata, at least one string of one or more terms; and
  determining the tentative NLU result for the one or more preceding natural language inputs by determining an intent associated with the one or more preceding natural language inputs, a string of terms, or a named entity.

15. The system of claim 9, wherein parsing the first natural language input to determine the first pretag result further comprises parsing the first natural language input based on additional metadata to determine the first pretag result, and wherein the additional metadata comprises metadata associated with at least one of: a list of favorite websites, a favorite telephone number list, a favorite mobile applications list, a favorite restaurants list, a favorite business list, or a favorite location list.

16. One or more non-transitory computer-readable storage media having instructions stored thereon, that when executed by one or more processors, cause the one or more processors to perform:
  determining, by a device, a preceding pretag result and a tentative NLU result, for each of one or more preceding natural language inputs;
  storing, in a cache, one or more keys, each key comprising one preceding pretag result and a corresponding tentative NLU result;
  receiving, by the device, a first natural language input comprising a set of one or more terms;
  parsing the first natural language input to determine a first pretag result comprising at least a first string comprising at least one term from the set of one or more terms, wherein the parsing comprises determining whether any of the one or more terms match metadata associated with a contacts list;
  determining whether the first pretag result corresponds to at least one key stored in the cache;
  if the first pretag result corresponds to at least one key stored in the cache, retrieving, from the cache, one or more cached NLU results corresponding to the at least one key; and
  if the first pretag result does not correspond to at least one key stored in the cache:
    determining, based on the set of one or more terms, a first NLU result corresponding to the first natural language input, the first NLU result comprising an intent associated with the first natural language input;
    storing, in the cache, the first NLU result; and
    storing, in the cache, a first key comprising the first pretag result, the first key corresponding to the first NLU result.

17. The one or more non-transitory computer-readable storage media of claim 16, wherein the first pretag result corresponds to at least one key stored in the cache, the instructions further cause the one or more processors to perform determining, for the first natural language input, a final NLU result based on the first pretag result and the one or more cached NLU results.

18. The one or more non-transitory computer-readable storage media of claim 16, wherein the first pretag result does not correspond to at least one key stored in the cache, and wherein the cache stores the first NLU result and the first key comprising the first pretag result, the instructions further cause the one or more processors to perform:

receiving a second natural language input comprising one or more terms;

parsing the second natural language input to determine a second pretag result;

determining that the second pretag result corresponds to the first key stored in the cache; and retrieving from the cache the first NLU result.

19. The one or more non-transitory computer-readable storage media of claim 16, wherein parsing the first natural language input to determine the first pretag result comprises determining a named entity based on the one or more terms comprised in the first natural language input, the named entity comprising at least one of the one or more terms comprised in the first natural language input.

20. The one or more non-transitory computer-readable storage media of claim 16, wherein parsing the first natural language input to determine the first pretag result further comprises parsing the first natural language input based on additional metadata to determine the first pretag result, and wherein the additional metadata comprises metadata associated with at least one of: a list of favorite websites, a favorite telephone number list, a favorite mobile applications list, a favorite restaurants list, a favorite business list, or a favorite location list.

* * * * *